United States Patent
Kurabayashi

(10) Patent No.: US 10,896,497 B2
(45) Date of Patent: Jan. 19, 2021

(54) INCONSISTENCY DETECTING SYSTEM, MIXED-REALITY SYSTEM, PROGRAM, AND INCONSISTENCY DETECTING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 31 days.

(21) Appl. No.: 16/450,041

(22) Filed: Jun. 24, 2019

(65) Prior Publication Data

US 2019/0311471 A1  Oct. 10, 2019

Related U.S. Application Data

(63) Continuation of application No. PCT/JP2017/043332, filed on Dec. 1, 2017.

(30) Foreign Application Priority Data

Dec. 22, 2016 (JP) ................... 2016-249429

(51) Int. Cl.
*G06T 7/00* (2017.01)
*H04N 13/344* (2018.01)
(Continued)

(52) U.S. Cl.
CPC ........ *G06T 7/0002* (2013.01); *G02B 27/0172* (2013.01); *G06F 3/01* (2013.01);
(Continued)

(58) Field of Classification Search
CPC ..... G06T 7/0002; G06T 19/00; G06T 19/006; H04N 13/344; G02B 27/0172; G06F 3/01
See application file for complete search history.

(56) References Cited

U.S. PATENT DOCUMENTS 9,720,505 B2  8/2017  Gribetz et al.
9,836,885 B1*  12/2017  Eraker ................ G06F 3/04815
(Continued)

FOREIGN PATENT DOCUMENTS

JP  2013-69235 A   4/2013
JP  2017-227975 A  12/2017
(Continued)

OTHER PUBLICATIONS

Google Scholar Search Results.*
(Continued)

*Primary Examiner* — Qun Shen
(74) *Attorney, Agent, or Firm* — Osha Bergman Watanabe & Burton LLP

(57) ABSTRACT

The present invention is an inconsistency detecting system in a mixed-reality system that includes a portable display device having a transmissive display unit and a photographing unit for photographing a real space and that renders a virtual object on the display unit in a predetermined real space such that the virtual object is visually recognized by a user, wherein the inconsistency detecting system generates first point cloud data from a combined image obtained by displaying the virtual object in a superimposed fashion on a naked-eye visual-field image, generates second point cloud data by using point cloud data of the three-dimensional space in the determined user environment as well as point cloud data of the virtual object, and detects an inconsistency on the basis of a result of comparison between the first point cloud data and the second point cloud data.

8 Claims, 15 Drawing Sheets

(51) Int. Cl.
*G02B 27/01* (2006.01)
*G06T 19/00* (2011.01)
*G06F 3/01* (2006.01)

(52) U.S. Cl.
CPC ............ *G06T 19/00* (2013.01); *G06T 19/006* (2013.01); *H04N 13/344* (2018.05); *G06T 2200/04* (2013.01)

(56) References Cited

U.S. PATENT DOCUMENTS

| | | | |
|---|---|---|---|
| 10,168,791 B2 | 1/2019 | Gribetz et al. | |
| 10,540,014 B2 | 1/2020 | Gribetz et al. | |
| 2005/0148859 A1* | 7/2005 | Miga | G06T 7/38 600/410 |
| 2010/0207936 A1* | 8/2010 | Minear | G06T 7/30 345/419 |
| 2012/0120201 A1* | 5/2012 | Ward | A63F 13/213 348/47 |
| 2014/0184496 A1 | 7/2014 | Gribetz et al. | |
| 2015/0161818 A1* | 6/2015 | Komenczi | H04N 13/25 348/43 |
| 2017/0124713 A1* | 5/2017 | Jurgenson | G06T 7/246 |
| 2018/0095541 A1 | 4/2018 | Gribetz et al. | |
| 2019/0278379 A1 | 9/2019 | Gribetz et al. | |

FOREIGN PATENT DOCUMENTS

| | | |
|---|---|---|
| KR | 2015-0103723 A | 9/2015 |
| KR | 2016-0034513 A | 3/2016 |
| WO | 2016/084142 A1 | 6/2016 |

OTHER PUBLICATIONS

International Search Report issued in Application No. PCT/JP2017/043332, dated Feb. 13, 2018 (3 pages).

Written Opinion issued in International Application No. PCT/JP2017/043332, dated Feb. 13, 2018 (3 pages).

Agarwal, Sameer; et al.; "Building Rome in a day;" Communication of the ACM; Oct. 2011; vol. 54; No. 10; pp. 105-112; DOI=http://dx.doi.org/10.1145/2001269.2001293 (8 pages).

Office Action in counterpart Korean Patent Application No. 10-2019-7018856 dated Aug. 14, 2020 (10 pages).

* cited by examiner

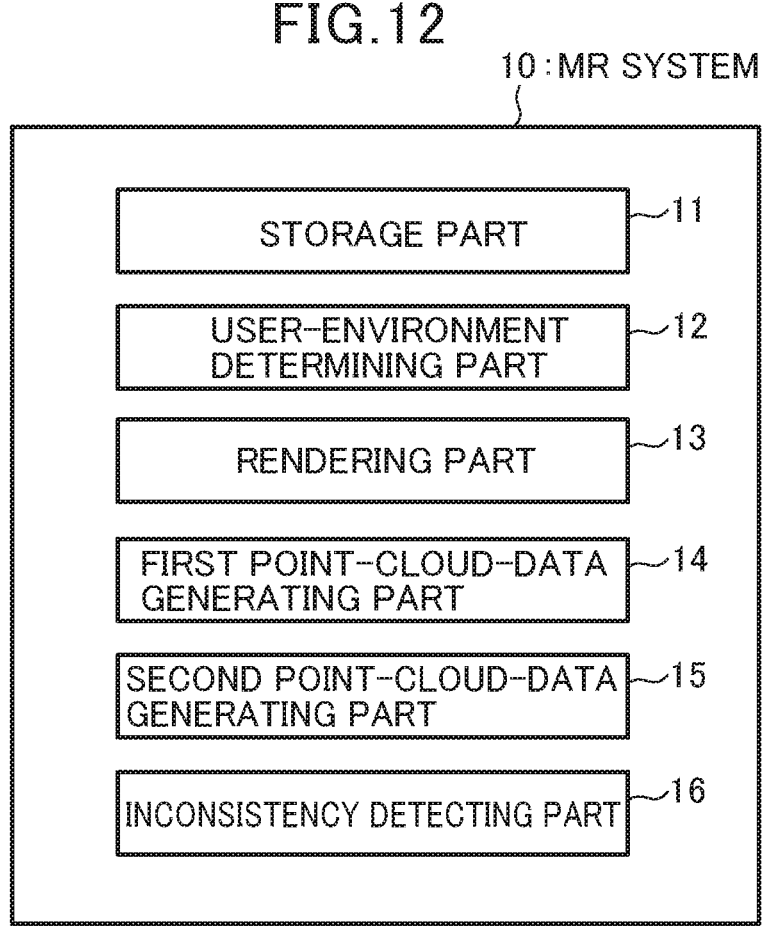

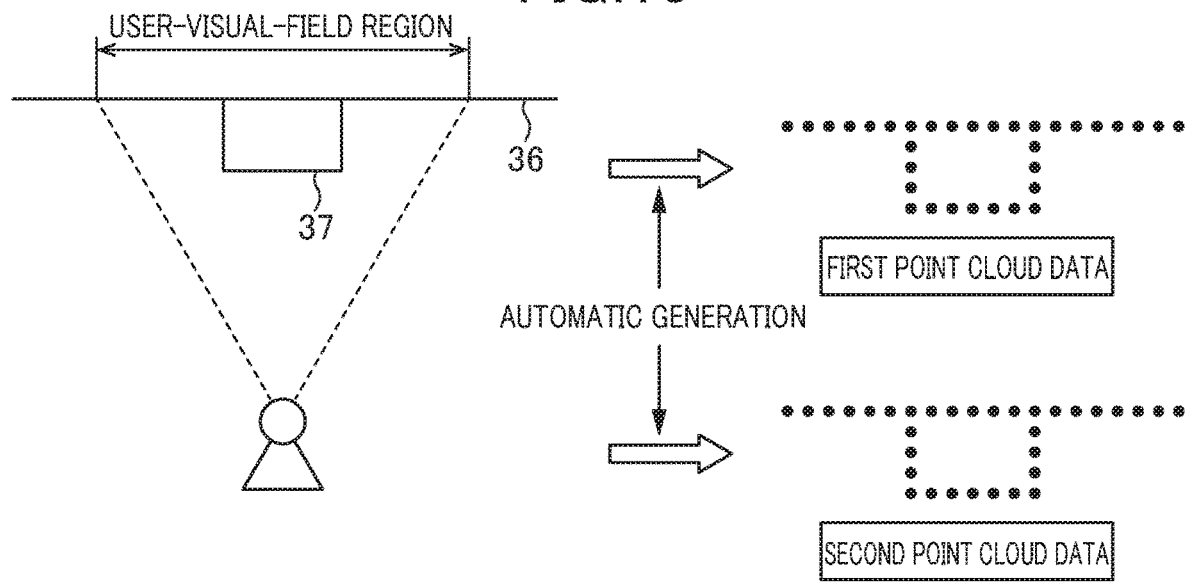
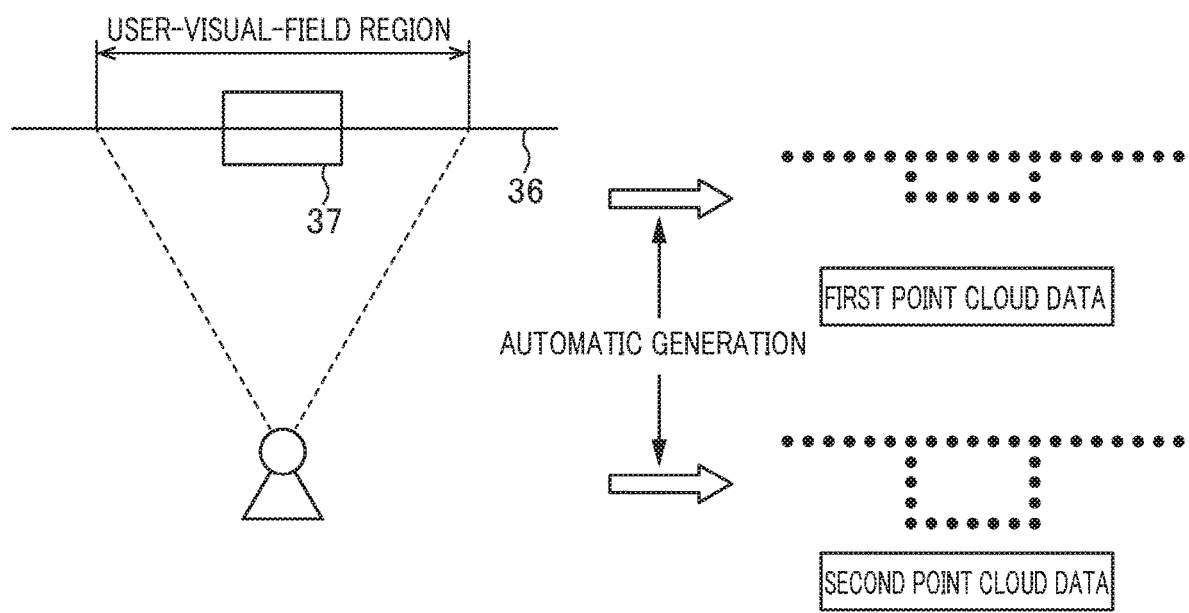

INCONSISTENCY DETECTING SYSTEM, MIXED-REALITY SYSTEM, PROGRAM, AND INCONSISTENCY DETECTING METHOD

TECHNICAL FIELD

The present invention relates to inconsistency detecting systems, etc. In particular, the present invention relates to an inconsistency detecting system, etc. in a mixed-reality system that allows a user present in a predetermined real space to experience a sense of mixed reality.

BACKGROUND ART

Recently, a technology for mixed reality called MR is a known technology for integrating the real world with a virtual world seamlessly in real time. MR technology makes it possible for a user experiencing MR to perceive it as if a virtual object existed there, and is receiving Interest in various fields. A user wears an optical see-through HMD (Head Mounted Display) or a video see-through HMD, which enables the user to view a mixed-reality image displayed in a superimposed fashion on the HMD, thereby experiencing a sense of mixed reality.

There are two known methods as technologies for recognizing the real world as a 3D space: namely, a method in which a high precision camera from the user's viewpoint is installed, and a method in which cameras are installed so as to surround an observation space.

As the method in which a high-precision camera from the user's viewpoint is installed, there is a method in which an infrared projector and an infrared camera are used. For example, as the method in which a high-precision camera from the user's viewpoint is installed, there is a method in which infrared rays are radiated and the depth of an object is measured from a distortion in the reflection pattern of the infrared rays. Furthermore, in methods called time of flight (TOF), there is a method in which invisible light, such as infrared rays, is radiated and the reflection thereof is measured to calculate the roundtrip distance to a target object. These methods suffer from the problems that: the range of space that can be handled three-dimensionally is limited to the range of reach of the infrared rays; and they cannot be used with solar effects.

Furthermore, as a method of photographing three-dimensional information with extremely high precision, there is a method employing a 3D laser scanner. With this method, although it is possible to realize high measurement precision, it takes 10 minutes at the minimum, and about 30 minutes for a standard image quality, in order to perform measurement over 360 degrees. This prohibits the adoption of this method in real-time applications. Furthermore, 3D laser scanners are very expensive, costing a few million to a few tens of million yen each, which makes them unsuitable for large-scale deployment over a wide area. Because of these characteristics, 3D laser scanners are being used in applications in which sufficiently long time is afforded for high-precision 3D modeling, such as surveying in civil engineering and layout confirmation in factories. For example, in the technology realized according to Patent Literature 1, the colors or an image photographed by a camera are assigned to point cloud data created by scanning with a 3D image scanner, making it possible to recognize the real world as a 3D space.

As a method in which cameras are installed so as to surround an observation space, there is a method in which original three-dimensional information is restored from a plurality of separately photographed images by using a technology called Structure-from-Motion (SfM), which is described in Non-Patent Literature 1. A well-known product that adopts this method is Microsoft Photosynth (registered trademark). Although the precision realized by SfM is relatively low compared with the precision required for MR technology, SfM is a method that makes it possible to construct 3D models inexpensively. However, SfM has only low real-time properties and cannot be directly applied to the implementation of an MR environment.

As described above, with these methods, it is not possible to simultaneously realize real-time properties and high-precision measurement.

CITATION LIST

Patent Literature

{PTL 1}
Japanese Unexamined Patent Application, Publication No. 2013-69235

Non Patent Literature

{NPL 1}
Sameer Agarwal, Yasutaka Furukawa, Noah Snavely, Ian Simon, Brian Curless, Steven M. Seitz, and Richard Szeliski. 2011. Building Rome in a day. Commun. ACM 54, 10 (October 2011), 105-112. DOI=http://dx.doi.org/10.1145/2001269.2001293

SUMMARY OF INVENTION

Technical Problem

As described above, there has not yet been any established method of recognizing a structure or environment in the real world in real time and with high precision and reflecting the result in a virtual space. In view of this situation, in Japanese Patent Application No. 2016-121928, the applicant proposed a mixed-reality system that is capable of recognizing a real-space environment in real time in a mixed-reality environment.

The mixed-reality system generates a high-precision three-dimensional virtual space having a structure and colors matching with those of a real space with an extremely high precision, whereby global illumination utilizing the lighting state in the real world is realized, and high-precision position tracking of the user is also realized.

Here, one of the chief objects of the mixed-reality system is to provide the user with a seamless mixed-reality space, in which an object in a virtual space (virtual object) is effectively in accurate contact with an object such as the ground or a building in real space (real object).

In order to realize such a mixed-reality system, it is necessary to maintain geometric consistency in real time in accordance with the current position and movement of an HMD so as to correctly superimpose a virtual object and a real object. In particular, when displaying, as a virtual character (virtual object), a human or an animal that stands on the ground and that touches objects, the integrity of boundary processing (alignment processing), i.e., geometric consistency, is extremely important in order to confer reality to the virtual object.

However, with an optical see-through HMD, it is not possible to subject a real object to video (image) processing as an image on which a virtual object is to be superimposed, and only simple optical superimposition is allowed. Thus, it is extremely difficult to ensure the integrity of alignment processing. The integrity of alignment processing (geometric consistency) depends on the precision of position tracking of the user. Meanwhile, geometric inconsistency between a virtual object and a real object occurs due to a reason such as accumulation of position tracking errors. However, there has been a problem in that, with localization technology alone, which is used for the purpose of position tracking in a mixed-reality system, self-detection (self-diagnosis) of recognition errors on the order of a few centimeters, which result in geometric inconsistencies, is not possible.

The present invention has been made in order to solve this problem, and a chief object thereof is to provide an inconsistency detecting system that makes it possible to detect an inconsistency when a geometric inconsistency occurs between an object in a virtual space and an object in a real space in a mixed-reality system in which an optical see-through HMD is used.

Solution to Problem

In order to achieve the above object, an inconsistency detecting system according to an aspect of the present invention is an inconsistency detecting system in a mixed-reality system that includes a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, characterized in that: the mixed-reality system includes a three-dimensional-space-data storage part configured to store three-dimensional space data including point cloud data of a real object located in the predetermined real space, acquired in advance, the point cloud data each having three-dimensional position information; a user-environment determining part configured to determine, on the basis of data obtained from a sensor included in the display device and the three-dimensional space data, a user environment including the position of the display device and also including a visual-field region that is visually recognized by the user through the display unit; and a rendering part configured to render the virtual object on the display unit on the basis of the user environment, and the inconsistency detecting system includes a first point-cloud-data generating part configured to generate first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image; a second point-cloud-data generating part configured to generate second point cloud data by using point cloud data in the visual-field region determined by the user-environment determining part, stored by the three-dimensional-space-data storage part, as well as point cloud data of the virtual object that is rendered by the rendering part; and an inconsistency detecting part configured to detect an inconsistency on the basis or a result of comparison between the first point cloud data and the second point cloud data.

Furthermore, preferably, in the present invention, the photographing unit acquires real spaces as stereoscopic images, and the first point-cloud-data generating part generates the first point cloud data from individual combined images obtained by individually displaying the virtual object that is rendered by the rendering part, in a superimposed fashion, on individual real-space images that are visually recognized by the user through the display unit, the individual real-space images being generated individually from two real-space images acquired as the stereoscopic images.

Furthermore, preferably, in the present invention, the first point-cloud-data generating part generates the real-space image that is visually recognized by the user through the display unit by subjecting the photographed real-space image to projective transformation on the basis of a positional relationship between the display unit and the photographing unit.

Furthermore, preferably, in the present invention, the inconsistency detecting part detects an inconsistency in the case where the difference between the first point cloud data and the second point cloud data exceeds a predetermined amount.

Alternatively, preferably, in the present invention, the inconsistency detecting part detects an inconsistency in the case where the difference between the first point cloud data and the second point cloud data exceeds a predetermined amount in a predetermined three-dimensional space region including the virtual object that is rendered on the basis of the user environment.

Furthermore, in order to achieve the above object, a mixed-reality system according to an aspect of the present invention is a mixed-reality system that includes a server as well as a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, characterized in that each of the following part is included in the server or the display device: a three-dimensional-space-data storage part configured to store three-dimensional space data including point cloud data of a real object located in the predetermined real space, acquired in advance, the point cloud data each having three-dimensional position information; a user-environment determining part configured to determine, on the basis of data obtained from a sensor included in the display device and the three-dimensional space data, a user environment including the position of the display device and also including a visual-field region that is visually recognized by the user through the display unit; a rendering part configured to render the virtual object on the display unit on the basis of the user environment; a first point-cloud-data generating part configured to generate first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image a second point-cloud-data generating part configured to generate second point cloud data by using point cloud data in the visual-field region determined by the user-environment determining part, stored by the three-dimensional-space-data storage part, as well as point cloud data of the virtual object that is rendered by the rendering part; and an inconsistency detecting part configured to detect an inconsistency on the basis of a result of comparison between the first point cloud data and the second point cloud data.

Furthermore, in order to achieve the above object, a program according to an aspect of the present invention is a non-transitory computer readable medium storing a program for detecting an inconsistency in a mixed-reality system that includes a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, characterized in that: the mixed-reality system includes a three-dimensional-space-data storage part configured to store three-dimensional space data including point cloud data of a real object located in the predetermined real space, acquired in advance, the point cloud data each having three-dimensional position information; a user-environment determining part configured to determine, on the basis of data obtained from a sensor included in the display device and the three-dimensional space data, a user environment including the position of the display device and also including a visual-field region that is visually recognized by the user through the display unit; and a rendering part configured to render the virtual object on the display unit on the basis of the user environment, and wherein the program causes the display device to execute: a step of generating first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image; a step of generating second point cloud data by using point cloud data in the visual-field region determined by the user-environment determining part, stored by the three-dimensional-space-data storage part, as well as point cloud data of the virtual object that is rendered by the rendering part; and a step of detecting an inconsistency on the basis of a result of comparison between the first point cloud data and the second point cloud data.

Furthermore, in order to achieve the above object, a method according to an aspect of the present invention is a method of detecting an inconsistency in a mixed-reality system that includes a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, characterized in that the mixed-reality system includes a three-dimensional-space-data storage part configured to store three-dimensional space data including point cloud data of a real object located in the predetermined real space, acquired in advance, the point cloud data each having three-dimensional position information; a user-environment determining part configured to determine, on the basis of data obtained from a sensor included in the display device and the three-dimensional space data, a user environment including the position of the display device and also including a visual-field region that is visually recognized by the user through the display unit; and a rendering part configured to render the virtual object on the display unit on the basis of the user environment, and the method includes a step of generating first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image; a step of generating second point cloud data by using point cloud data in the visual-field region determined by the user-environment determining part, stored by the three-dimensional-space-data storage part, as well as point cloud data of the virtual object that is rendered by the rendering part; and a step of detecting an inconsistency on the basis of a result of comparison between the first point cloud data and the second point cloud data.

Advantageous Effects of Invention

The present invention makes it possible to detect an inconsistency when a geometric inconsistency occurs between an object in a virtual space and an object in a real space in a mixed-reality system in which an optical see-through HMD is used.

BRIEF DESCRIPTION OF DRAWINGS

FIG. 12 is a functional block diagram of an MR system according to as embodiment of the present invention.

FIG. 13 is a schematic illustration for explaining the generation of first point cloud data and second point cloud data according to the embodiment of the present invention.

FIG. 14 is a schematic illustration for explaining the generation of first point cloud data and second point cloud data according to the embodiment of the present invention.

DESCRIPTION OF EMBODIMENTS

A mixed-reality (MR) system that provides a user with a mixed-reality space in which a virtual space and a real space are integrated, as well as an inconsistency detecting system in the MR system, will be described below with reference to the drawings. Throughout the drawings, the same reference sign denotes the same or corresponding part unless otherwise explicitly mentioned.

One of the technical features of an MR system according to an embodiment of the present invention is that the MR system is realized in a predefined real space (predetermined real space) and that a high-precision three-dimensional virtual space having a structure and colors matching those of the real space with extremely high precision is generated. This makes it possible to realize high-precision position tracking of a user.

Figure 2:
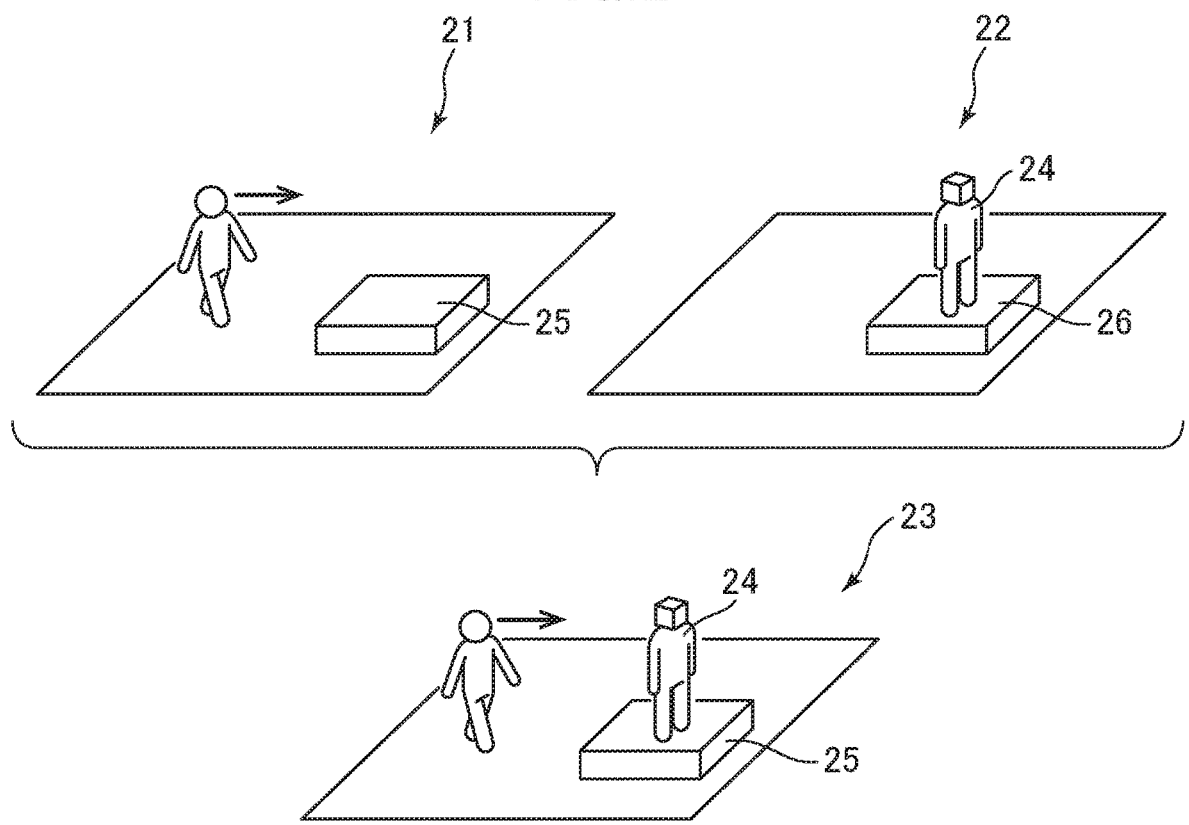
FIG. 2 is as illustration showing an overview of position tracking according to the embodiment of the present invention.

FIG. 2 shows a real world 21 in which a user is present, a virtual world 22 constructed from three-dimensional space data (DB), and a mixed-reality world (MR environment) 23 generated by matching the real world 21 and the virtual world 22 together in the MR system. In the MR environment 23, generally, the user wears a device having a display unit, such as an HMD. Although an HMD is equipped with various kinds of sensor devices, the measurement precisions of sensors that are conventionally used are not high enough to recognize the structure of the real world 21 with high precision and to realize the MR environment 23 such that the result of recognition is reflected in the virtual world 22.

Thus, the MR system according to this embodiment performs matching between the high-precision virtual space 22 and rough position information obtained from various kinds of sensors that are conventionally used, and corrects, in real time, deviations in the user's position and the direction in which the user is facing between the real world 21 and the virtual world 22. The various kinds of sensors that are conventionally used include a distance sensor, an image sensor, a direction sensor, a GPS sensor, and a Bluetooth (registered trademark) beacon. Thus, an MR environment 23 that is linked with reality with high precision is realized, whereby position tracking of the user is realized in the MR environment 23 described above, in the case where a character 24 is made to stand on a pedestal 26 in the virtual world 22, the user can visually recognize the character 24 standing on a pedestal 25 in the real world 21, without feeling a sense of unnaturalness. Note that the pedestal 26 is not an object that is displayed as a virtual object in the MR environment 23.

Figure 3:
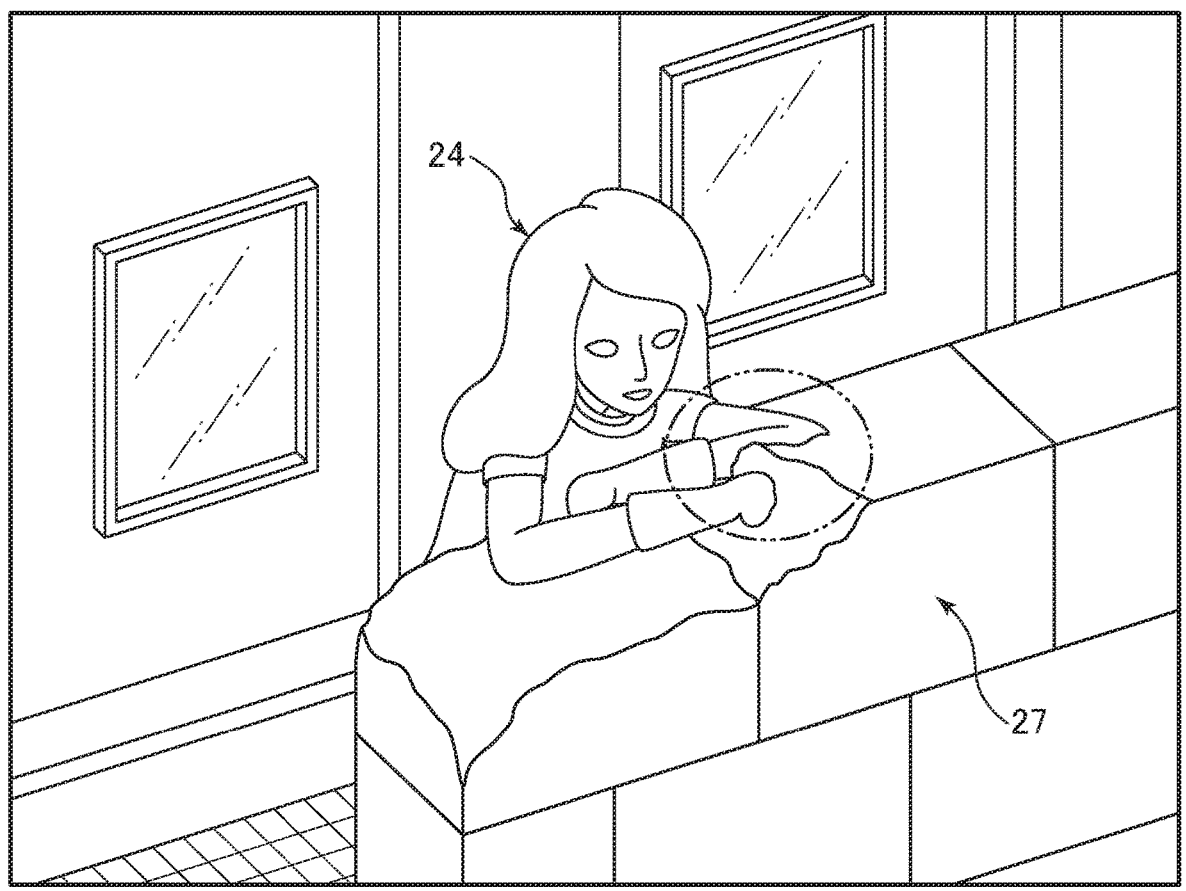
FIG. 3 is as illustration showing a situation where a character in a virtual world leans on a wall in the real world in the MR system according to the embodiment of the present invention.
Figure 4:
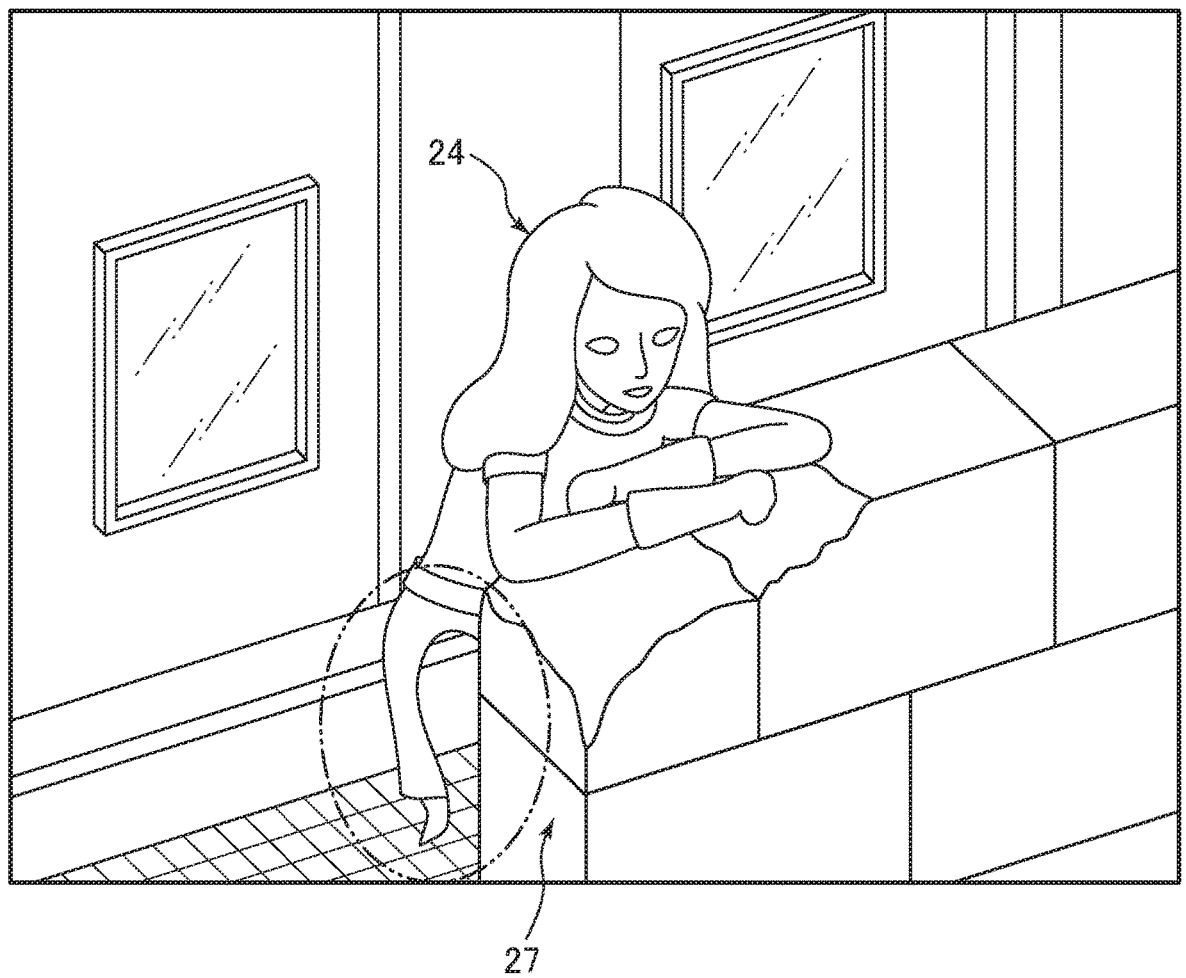
FIG. 4 is an illustration showing a situation where the character in the virtual world leans on the wall in the real world in the MR system according to the embodiment of the present invention.

As described earlier, in the MR system according to this embodiment, geometric consistency (collision relationships, depth relationships, occlusions, etc.) with real objects (a building, a bench, etc.) when a virtual object is displayed is extremely important in order to confer reality to the virtual object. For example, FIGS. 3 and 4 show situations in which the character 24 in the virtual world 22 leans on a wall in the real world 21. In FIG. 3, an arm of the virtual character (virtual object) 24 is excessively buried in a wall (real object) 27. In FIG. 4, a part of the virtual character 24 is unnecessarily eroded. These kinds of display considerably compromise reality and thus must be prevented. With the localization technology used for position tracking, described earlier, however, it is not possible to self-detect recognition errors in the three-dimensional space.

The inconsistency detecting system according to the embodiment of the present invention detects inconsistency when a geometric inconsistency occurs between a virtual object and a real object, for example, as shown in FIGS. 3 and 4. In the following description of a specific configuration, the MR system including the inconsistency detecting system will be described first for convenience of description.

Figure 1:
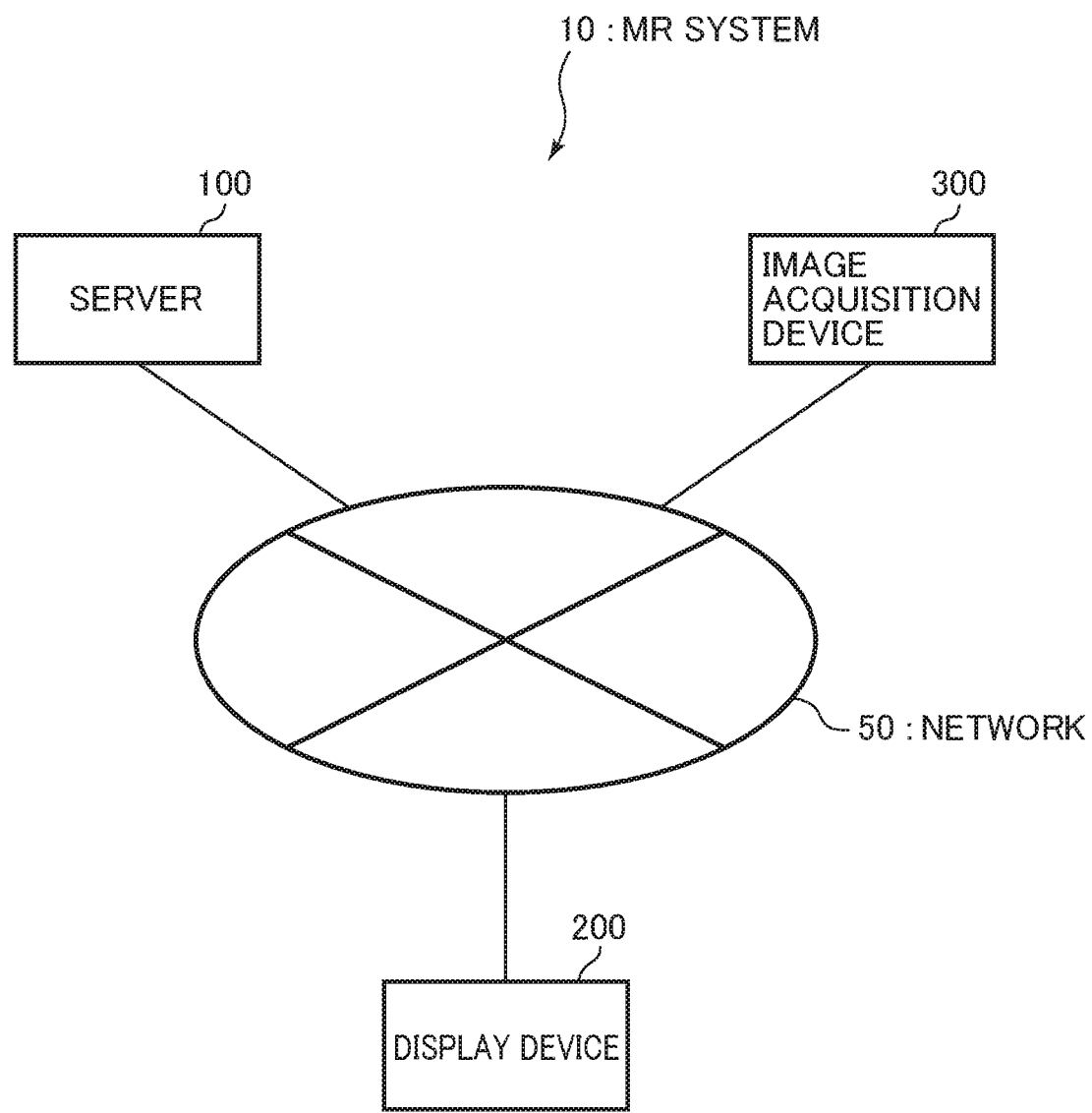
FIG. 1 is as overall configuration diagram of an MR system according to an embodiment of the present invention.

FIG. 1 is an example of an overall configuration diagram of an MR system 10 according to the embodiment of the present invention. As shown in FIG. 1, the MR system 10 includes a server 100, one or more display devices 200, and one or more image acquisition devices 300. The server 100, the display devices 200, and the image acquisition devices 300 are connected to a network 50, such as the Internet, so as to be able to carry out communications with each other. The image acquisition devices 300 are devices that are required to maintain optical consistency in real time in the MR system 10 such that shadows of real objects and virtual objects are displayed without causing a sense of unnaturalness. Thus, the MR system 10 according to the embodiment of the present invention need not include the image acquisition devices 300.

The MR system 10 is assumed to be a server-client system, and preferably, the display devices 200 and the image acquisition devices 300 carry out communications only with the server 100. Alternatively, however, the MR system 10 may be configured as a system not including a server, such as a P to P system.

The MR system 10 allows a user present in a predetermined real space to experience a sense of mixed reality. The predetermined real space is a predefined indoor or outdoor real space, and real objects, which are objects in the real world, exist in that space. For example, the real objects are structures such as a building, a bench, and a wall, which are stationary in the real space. However, the real objects may include mobile items.

Figure 5:
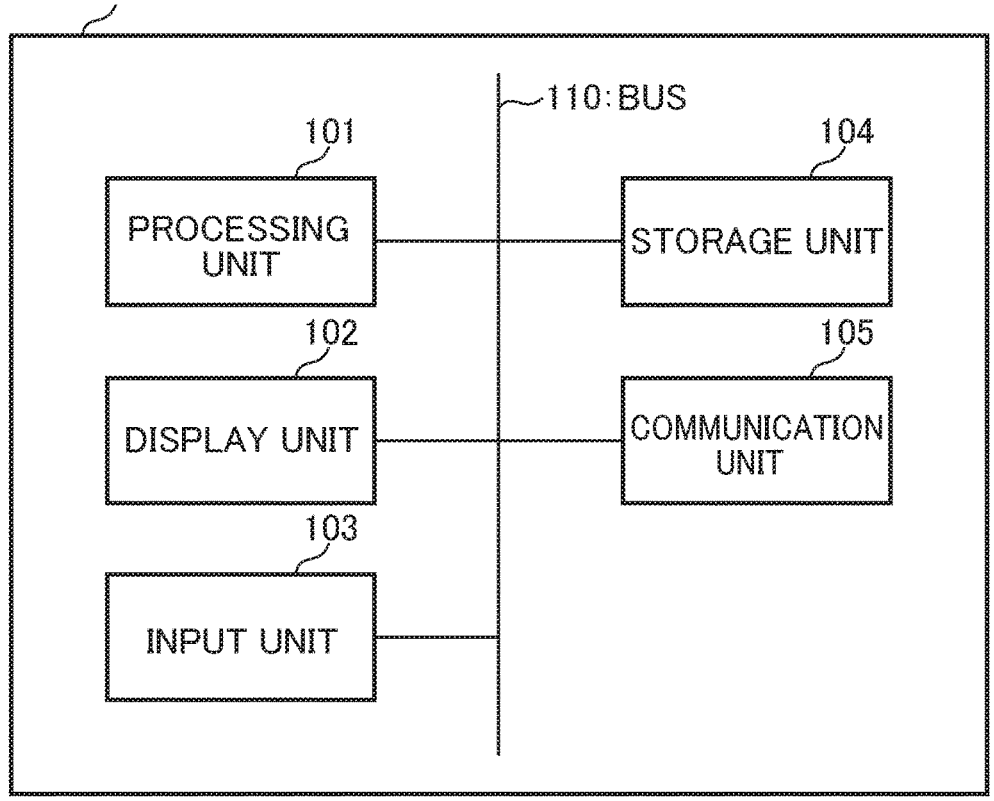
FIG. 5 is a block diagram showing the hardware configuration of a server according to the embodiment of the present invention.

FIG. 5 is a block diagram showing the hardware configuration of the server 100 according to the embodiment of the present invention. The server 100 includes a processing unit 101, a display unit 102, an input unit 103, a storage unit 104, and a communication unit 105. These components are connected to each other via a bus 110. Alternatively, however, the components may be connected to each other individually as needed.

The processing unit 101 includes a processor (e.g., a CPU) that controls the individual components of the server 100, and executes various kinds of processing by using the storage unit 104 as a work area. In the case where the server 100 renders virtual objects, the processing unit 101 preferably includes a GPU that executes rendering processing, separately from the CPU.

The display unit 102 displays information to a server user. The input unit 103 accepts inputs to the server 100 from the user; for example, the input unit 103 is a touchscreen, a touchpad, a keyboard, or a mouse.

The storage unit 104 includes a hard disk, a main memory, and a buffer memory. The hard disk stores programs. Alternatively, however, in place of the hard disk, any type of non-volatile storage or non-volatile memory that can store information may be used, which may be of the removable type. The storage unit 104 stores programs and various kinds of data that may be referred to in relation to the execution of the programs. In the case where the processing unit 101 includes a GPU, the storage unit 104 may include a video memory.

The storage unit 104 can store data (e.g., tables) and programs for various kinds of databases. The various kinds of databases are realized by the operation of the processing unit 101, etc. For example, the server 100 may be provided with the functionality of a database server, may include a database server, or may include or may be provided with other kinds of servers. In one example, the server 100 is provided with a database relating to three-dimensional space data for constructing a virtual space, and the storage unit 104 stores data and a program for this database.

The communication unit 105 carries out wired communications using an Ethernet (registered trademark) cable or the like or wireless communications such as mobile communications or wireless LAN communications to connect to the network 50.

The various functions of the server 100 are realized by executing programs; alternatively, however, some of the functions may be realized by configuring electronic circuits or the like.

In one example, the server 100 is configured by combining a plurality of servers installed for individual functions or individual areas. For example, it is possible to divide the predetermined real space into a plurality of areas, install servers one per area, and install a server that integrates those servers.

In one example, when the server 100 renders a virtual object, the CPU writes a rendering command in the main memory, and the CPU refers to the rendering command and writes rendering data in a frame buffer in the video memory. Then, the server 100 sends the data read from the frame buffer as is to the display device 200.

Figure 6:
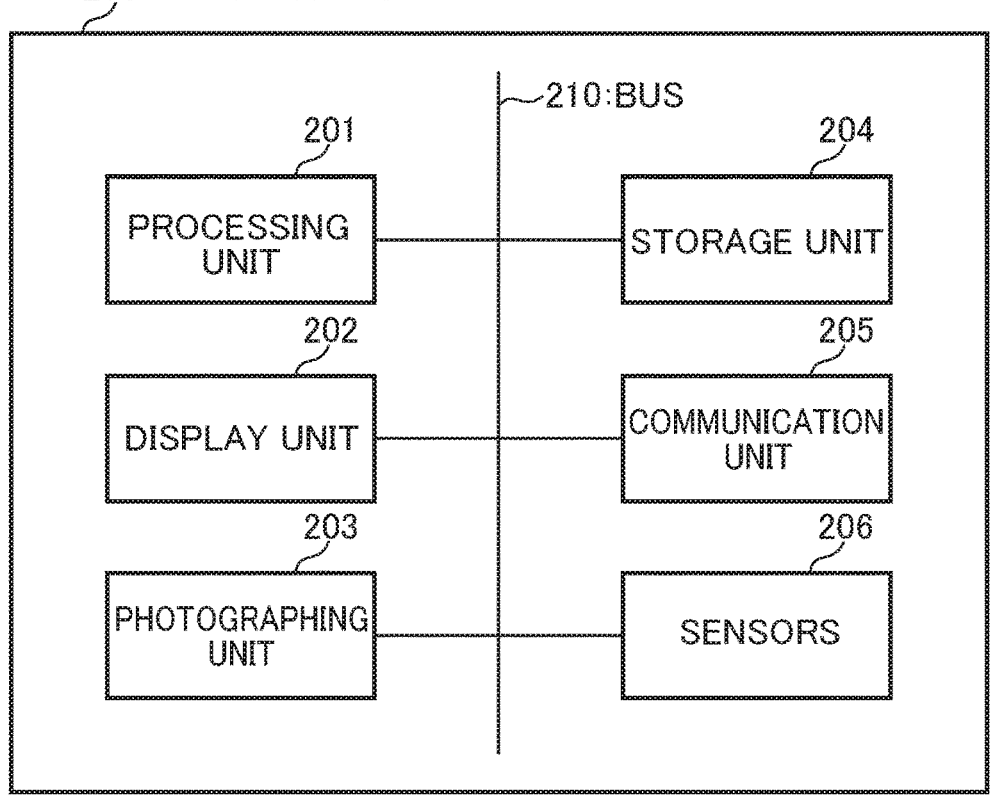
FIG. 6 is a block diagram showing the hardware configuration of a display device according to the embodiment of the present invention.

FIG. 6 is a block diagram showing the hardware configuration of the display device 200 according to the embodiment of the present invention. The display device 200 includes a processing unit 201, a display unit 202, a photographing unit 203, a storage unit 204, a communication unit 205, and sensors 206. These components are connected to each other via a bus 210. Alternatively, however, the components may be connected to each other individually as needed.

The display device 200 can be carried by the user and is preferably a head-mounted image display device (HMD) that can be worn on the head. Hereinafter, it is assumed that an HMD 200 is used as the display device 200 in the embodiment of the present invention.

The processing unit 201 includes a processor (e.g., a CPU) that controls the individual components of the HMD 200, and executes various kinds of processing by using the storage unit 204 as a work area. In one example, the HMD 200 receives a rendering command from the server 100 and executes rendering processing. In this case, the processing unit 201 includes a GPU that executes rendering processing, separately from the CPU.

The storage unit 204 includes a hard disk, a main memory, and a buffer memory. The hard disk stores programs. Alternatively, however, in place of the hard disk, any type of non-volatile storage or non-volatile memory that can store information may be used, which may be of the removable type. The storage unit 204 stores programs and various kinds of data that may be referred to in relation to the execution of the programs. In the case where the processing unit 201 includes a GPU, the storage unit 204 may include a video memory. Furthermore, the storage unit 204 can store data and programs for various kinds of databases. In this case, the various kinds of databases are realized by the operation of the processing unit 201, etc.

The display unit 202 is a transmissive display that is capable of displaying a virtual object to the user. That is, in the embodiment of the present invention, the HMD 200 is an optical see-through HMD. The HMD 200 allows the user wearing the HMD 200 to visually recognize the real space through the display unit 202, and in the case where a virtual object is rendered on the display unit 202, the HMD 200 can allow the user to visually recognize the virtual object through the display unit 202 such that the virtual object is superimposed on the real space.

In the embodiment of the present invention, when generating a virtual object to be rendered, the MR system 10 generates a right-eye image to be visually recognized by the right eye of the user and a left-eye image to be visually recognized by the left eye of the user. Accordingly, the display unit 202 includes a right-eye transmissive display that displays the right-eye image and a left-eye transmissive display that displays the left-eye image. Alternatively, the display unit 202 may include a single transmissive display having a display area including a right-eye-image display area and a left-eye image display area.

The photographing unit 203 includes a stereoscopic camera for photographing the real space and acquires the real space as a stereoscopic image. The photographing unit 203 stores photographed images (images of the real world) of the individual frames in the storage unit 204. In one example, the photographing unit 203 is configured to include a right-eye camera for photographing the real space as visually recognized by the right eye of the user and a left-eye camera for photographing the real space as visually recognized by the left eye of the user. Alternatively, however, the photographing unit 203 may include a single-lens camera and may be configured to acquire the real space as a stereoscopic image by using a known method.

Figure 7:
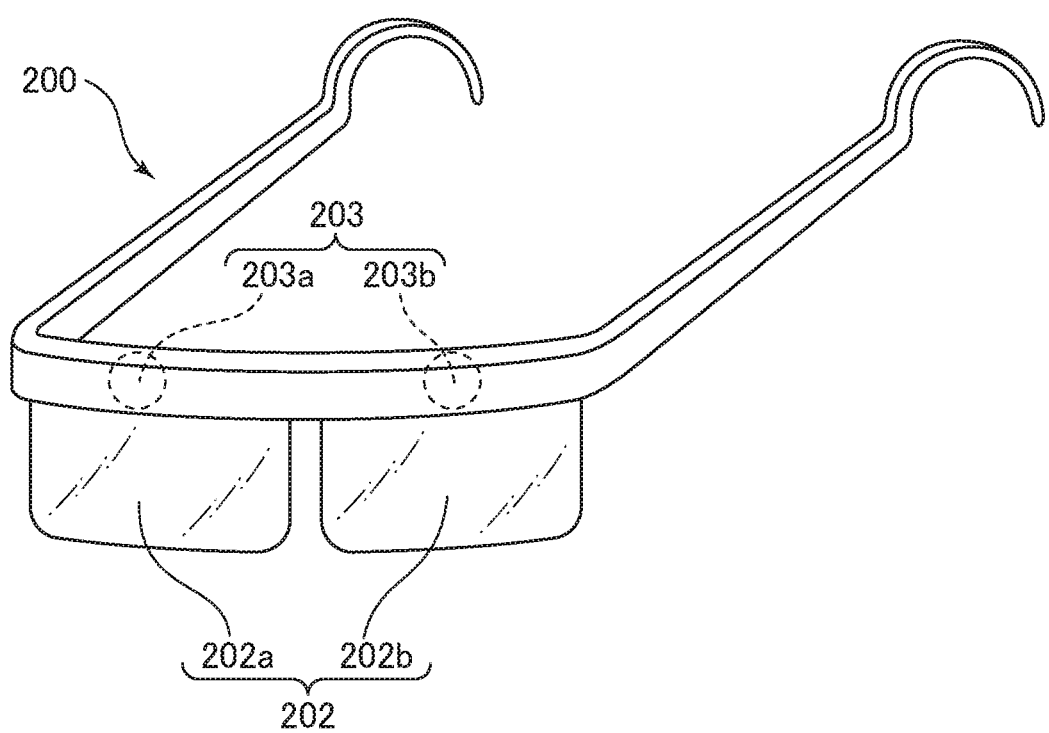
FIG. 7 is an example of a schematic illustration showing the configuration of an HMD according to the embodiment of the present invention.

FIG. 7 is a schematic illustration showing the configuration according to an example of the HMD 200. As shown in FIG. 7, the HMD 200 is provided with a display unit 202 including a right-eye transmissive display 202a for displaying a right-eye image and a left-eye transmissive display 202b for displaying a left-eye image. Furthermore, the HMD 200 is provided with a photographing unit 203 including a right-eye camera 203a installed in proximity to the right-eye transmissive display 202a and a left-eye camera 203b installed in proximity to the left-eye transmissive display 202b.

The right-eye transmissive display 202a is a transmissive display for the right eye and is capable of displaying a right-eye image generated by the MR system 10. With a transmissive display, since an image of the real world is directly viewed by the eye in a region where no image is displayed, an image of the virtual world (virtual object) and an image of the real world (real object) are optically combined together as a result. The same applies to the left-eye transmissive display 202b.

The right-eye camera 203a is a camera for photographing an image of the real world as viewed through the right-eye transmissive display 202a. As will be described later, in the embodiment of the present invention, the MR system 10 generates a real-space image that is visually recognized by the user through the right-eye transmissive display 202a (naked-eye visual-field image) from the image photographed by the right-eye camera 203a. Thus, it is necessary that the internal parameters of the right-eye camera 203a, such as the angle of view and the visual field range, have been calibrated with the space displayed by the right-eye transmissive display 202a. Specifically, it is possible to obtain an image that is visually recognized (viewed) by the user through the right-eye transmissive display 202a by applying a projection matrix calculated from the internal parameters to the image obtained from the right-eye camera 203a. The same applies to the left-eye camera 203b.

The sensors 206 are various kinds of sensors needed to utilize localization technology. In one example, the sensors 206 include an acceleration sensor, a gyro sensor, an infrared depth sensor, and a camera. The infrared depth sensor is a depth sensor based on infrared projection; however, the same function may be realized by using an RGB-D camera. The camera is a camera (e.g., a single-lens camera) different from the stereoscopic camera included in the photographing unit 203; alternatively, however, the stereoscopic camera included in the photographing unit 203 may be included as one of the sensors 206. Furthermore, the sensors 206 may include other various kinds of sensors that are conventionally used, such as a GPS sensor, a Bluetooth (registered trademark) beacon, and Wifi. In another example, the image acquisition device 300 may be included as one of the sensors 206.

The communication unit 205 carries out wireless communications, such as mobile communications or wireless LAN communications, to connect to the network 50. In one example, the communication unit 205 receives three-dimensional space data from the server 100. In one example, the communication unit 205 sends image data photographed by the photographing unit 203 to the server 100 via the network 50.

The image acquisition devices 300 acquire videos (images) of the real space and send the acquired image data to the server 100 or the display device 200 via the network 50. Furthermore, the image acquisition devices 300 are installed as stationary equipment at fixed points surrounding a predetermined real space so as to be capable of photographing a region visually recognizable by a user present in the predetermined real space. In one example, the image acquisition devices 300 are stationary cameras installed at fixed points. Furthermore, in one example, the image acquisition devices 300 acquire 30 image frames per second and send the image frames to the server 100.

Figure 8:
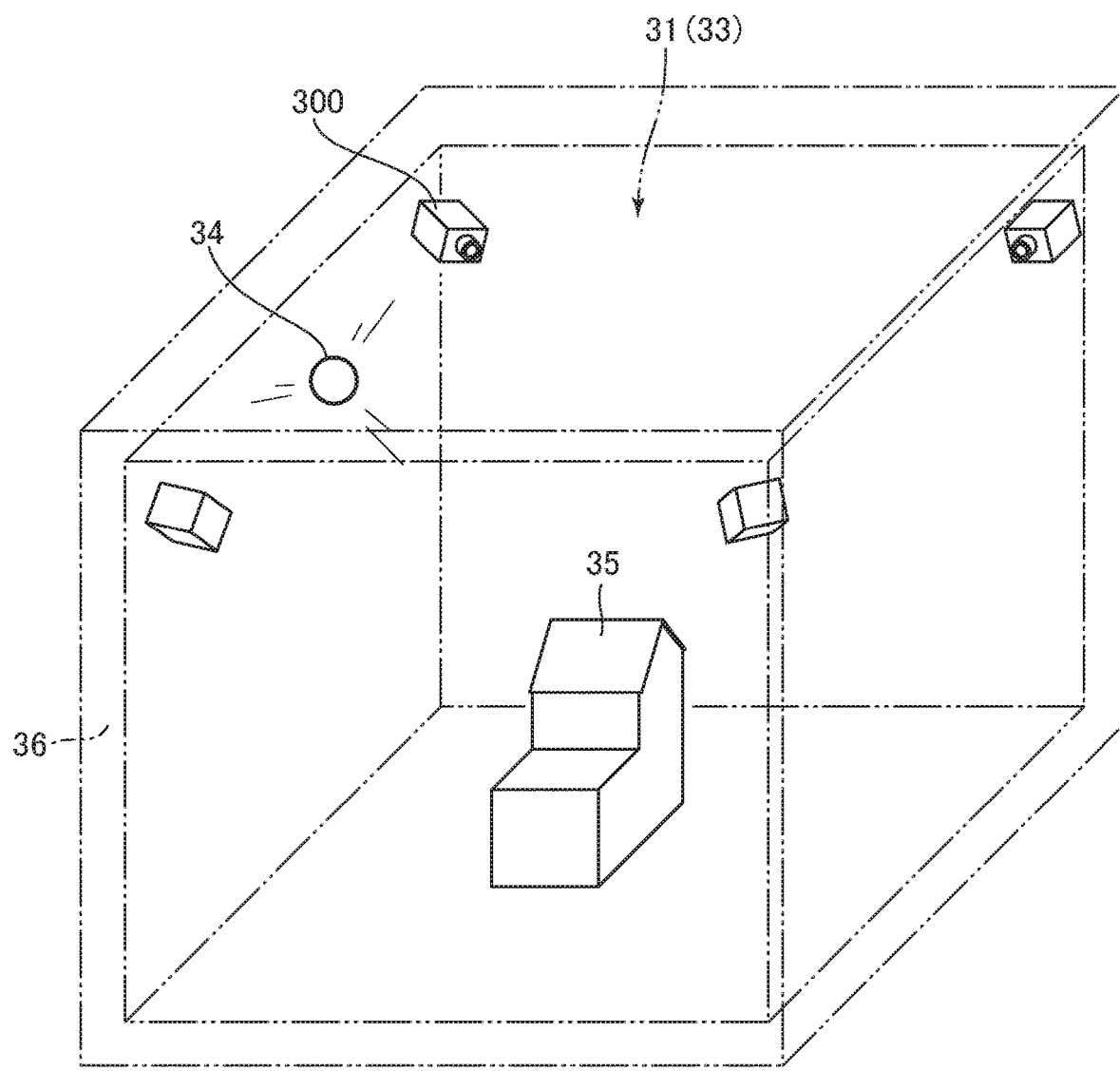
FIG. 8 is a schematic illustration of a real space according to the embodiment of the present invention.
Figure 9:
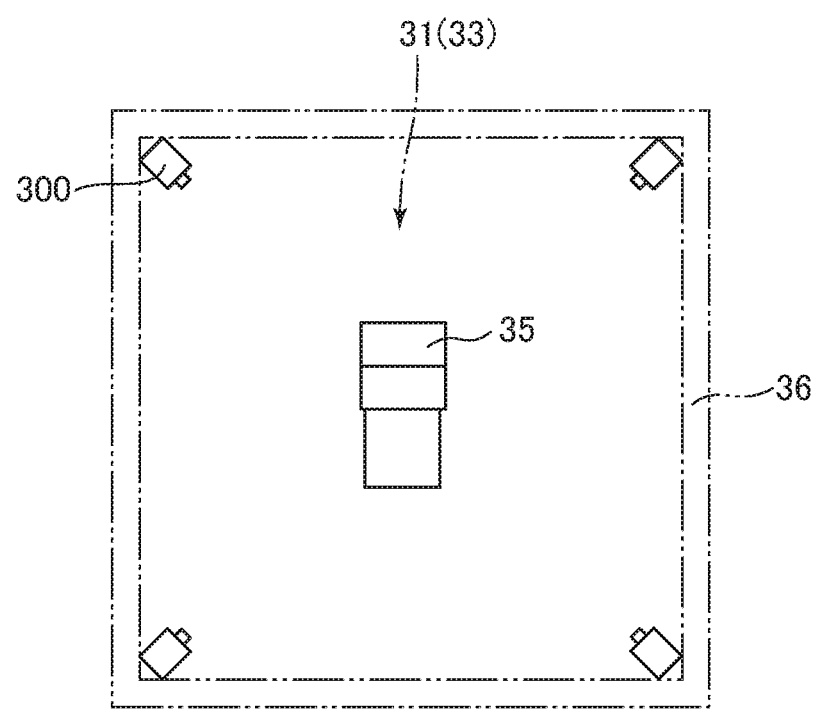
FIG. 9 is a plan view of the real space in FIG. 8 as viewed from above.

Here, as a real-world space (predetermined real space) in which the MR system 10 according to the embodiment of the present invention provides a user with a mixed-reality space 33, a real space 31, which is an indoor space enclosed by walls 36, as shown in FIG. 8, is assumed. FIG. 8 is a schematic illustration of the real space 31, and FIG. 9 is a plan view of the real space 31 as viewed from above. In the real space 31, a light source 34 in the real world and a building 35, which is a real object in the real world, exist. As shown in FIG. 8, in the real space 31, a plurality of image acquisition devices 300 are installed so as to make it possible to photograph a space visually recognizable by a user present in an observation space, i.e., the real space 31. Note, however, that the image acquisition devices 300 need not be installed in the embodiment of the present invention.

Figure 10:
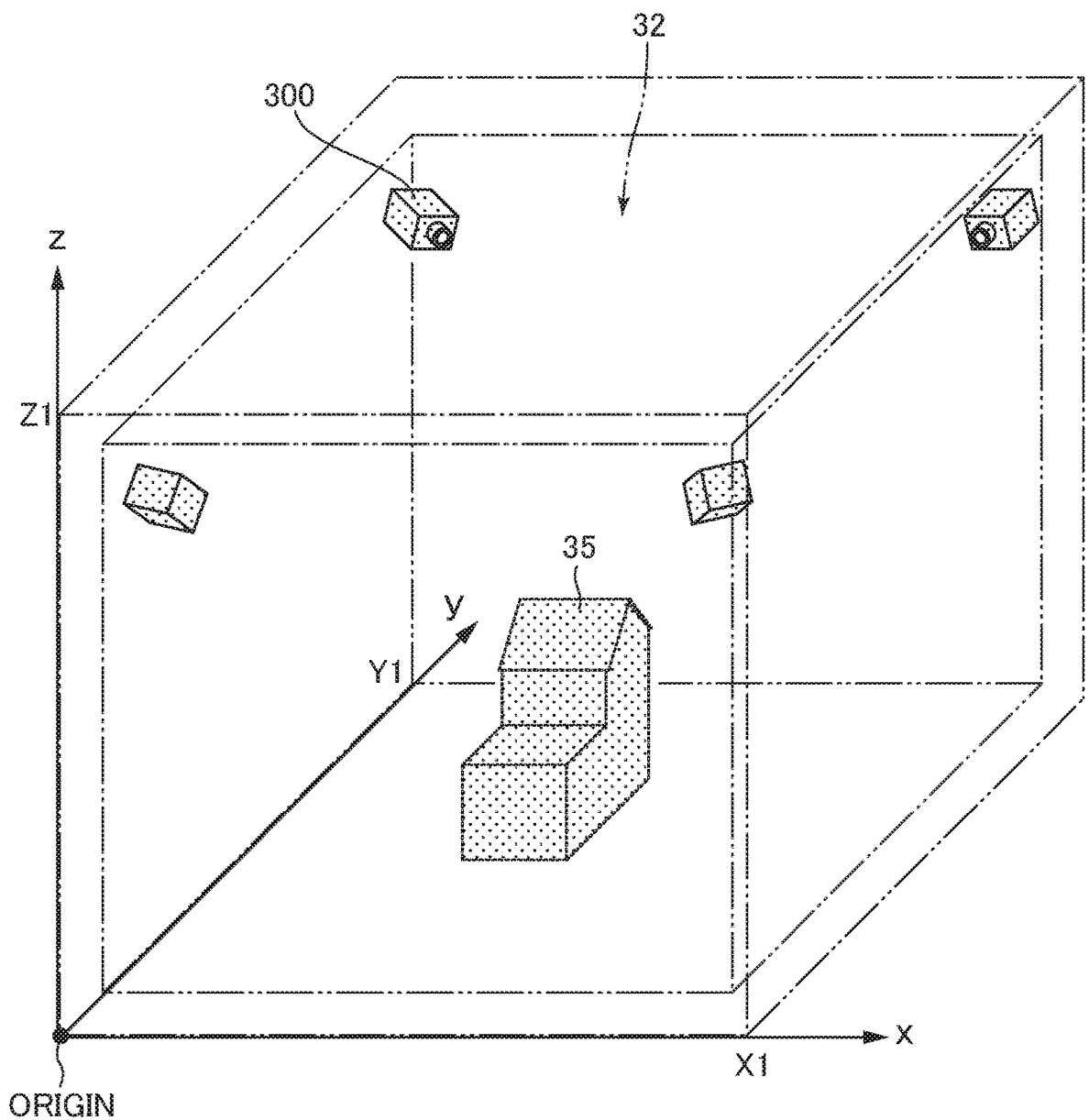
FIG. 10 shows three-dimensional space data represented by point cloud data acquired in the real space in FIG. 8.

FIG. 10 shows an example of point cloud data acquired in the real space 31. In the embodiment of the present invention, point cloud data representing the three-dimensional shapes of real objects in the real space 31 is obtained in advance, for example, by using a high-precision laser scanner (not shown). In the case where the image acquisition devices 300 are installed, it is preferred to acquire point cloud data after the image acquisition devices cameras 300 are installed in the real space 31.

As shown in FIG. 10, each item of point cloud data has three-dimensional coordinates (x, y, z) and is disposed in a virtual space 32 associated with the real space 31. Furthermore, each item of point cloud data is colored point cloud data including color information. The colored point cloud data is created by mapping color information obtained from images photographed separately from the acquisition of the point cloud data by using a camera included in the laser scanner onto the individual coordinates (x, y, z) of the point cloud in accordance with the position and orientation of the camera at the time of photographing.

For the purpose of representing the three-dimensional shapes of real objects in the virtual space 32 associated with the real space 31 as described above, it is possible to use point cloud data as a basic unit (basic component). In this specification, this basic unit will be referred to as a three-dimensional shape element.

In the embodiment of the present invention, in order to simplify the explanation, the acquired point cloud data is converted into a data structure called voxels by using a known method, such as OctoMap ("OctoMap: An Efficient Probabilistic 3D Mapping Framework Based on Octrees" in Autonomous Robots, 2013; A. Hornung, K. M. Wurm, M. Bennewitz, C. Stachniss, and W. Burgard (http://dx.doi.org/10.1007/s10514-012-9321-0) DOI: 10.1007/s10514-012-9321-0.). A voxel is a unit component of a three-dimensional space, corresponding to a pixel of a two-dimensional space, and is a cube having a certain size and identified by using coordinates in the three-dimensional space.

Figure 11:
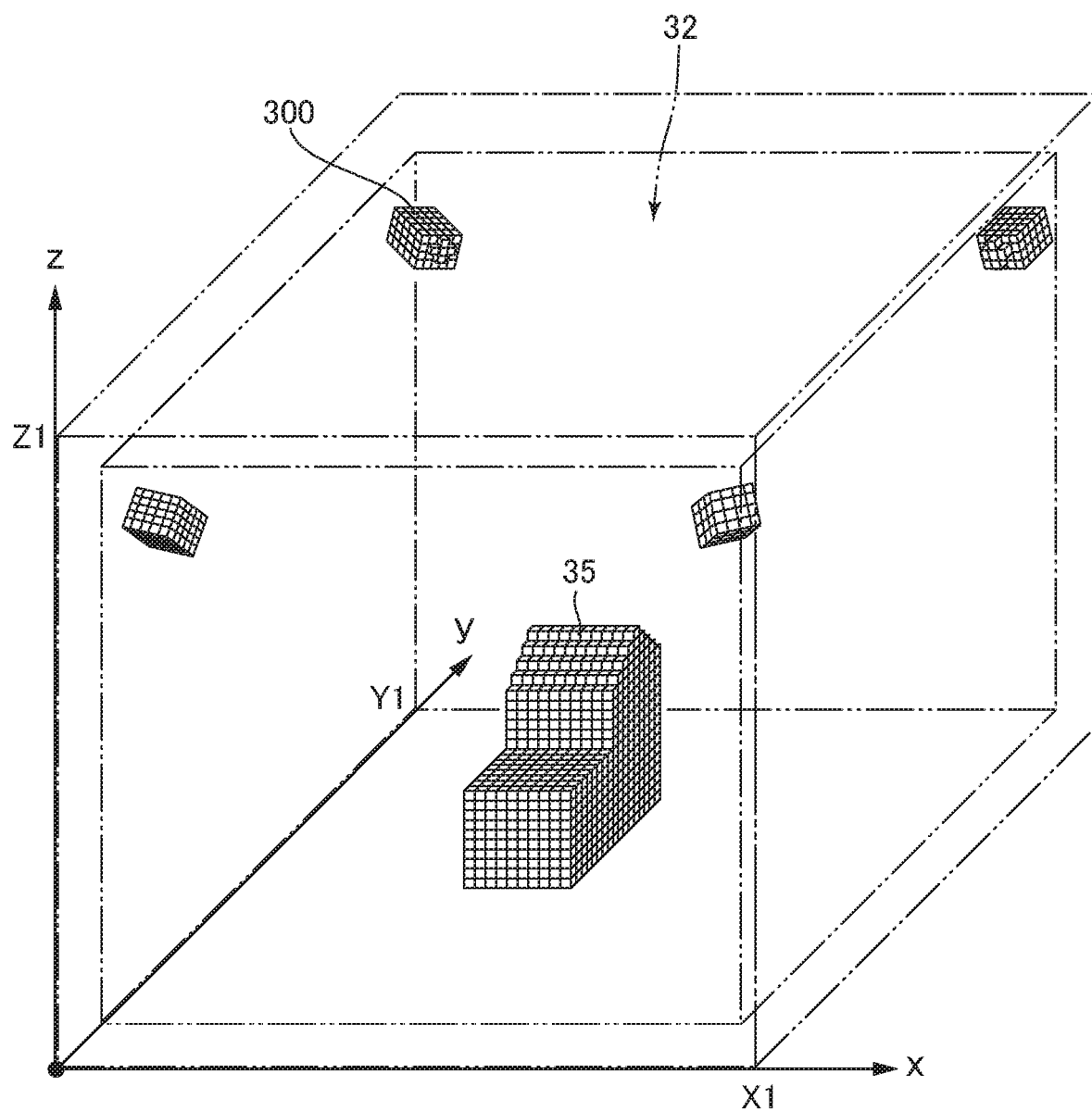
FIG. 11 shows three-dimensional space data represented by voxels created from the point cloud data in FIG. 10.

It is assumed hereinafter that, in the embodiment of the present invention, voxels are used as basic units representing the three-dimensional shapes of real objects in the virtual space 32 associated with the real space 31. That is, voxels serve as three-dimensional shape elements. FIG. 11 shows voxels created from the point cloud data in FIG. 10. The MR system 10 stores point cloud data and voxel data as three-dimensional space data in the storage unit 104 or 204. Alternatively, however, it is possible to use meshes (3D meshes) as three-dimensional shape elements. In this case, the MR system 10 stores point cloud data and 3D mesh data as three-dimensional space data in the storage unit 104 or 204. It is also possible to use point cloud data itself as three-dimensional shape elements. In this case, the MR system stores point cloud data as three-dimensional space data.

In one example, the real space is divided into 1 cm³ voxel volumes to set a voxel space (a three-dimensional space represented by voxels). Each voxel V has one or more items of color information c as viewed from the image acquisition devices 300 in addition to position information x, y, and z.

$$V = \{x, y, z, c_0, c_1, c_2, \ldots, c_T\} \quad (1)$$

The color information c is represented in a format such as RGB or HSV. In the case of representation in the HSV format, the color information includes hue, chroma, and lightness.

Furthermore, in the embodiment of the present invention, the virtual space 32 is considered as being limited to a region associated with the real space 31 ($0 \leq X \leq X1$, $0 \leq Y \leq Y1$, $0 \leq Z \leq Z1$). Alternatively, however, it is possible to set virtual spaces 32 for smaller regions and associate the plurality of virtual spaces individually with real spaces 31, or to set a virtual space 32 for a larger region. In the case where virtual spaces 32 are set for smaller regions, image acquisition devices 300 may be installed individually at a plurality of fixed points where it is possible to photograph a region visually recognizable by the user in each of the real spaces 31 associated with the individual virtual spaces 32.

In one example, in the case where the real space 31 is a wide space, preferably, virtual spaces 32 are set individually for a plurality of areas, and servers 100 are also installed individually for the plurality of areas. For example, in the case where the storage units 104 of the servers 100 store voxel data, each voxel V in equation (1) has 10 bytes assuming that 1 voxel=(int16 x, int16 y, int16 z, int32 rgb). For example, the real space is considered in terms of a model in the form of a set of 10 mm³ voxels. In the case where a wide space such as a theme park is converted into a high-precision voxel space, assuming that the region of the theme park is divided into grids of 10 m=10,000 mm, since the volume of each grid is 1,000 m³, the number of voxels is about 1,000,000,000. When the space is reduced to a height of up to 5 m, the number of voxels is about 500,000,000. That is, even if a memory is allocated naively for 500,000,000 voxels, GBytes suffice for storage, and thus it is easy to allocate a server 100 for each grid so as to realize an on-memory implementation.

FIG. 12 shows a functional block diagram of the MR system 10 according to the embodiment of the present invention. The MR system 10 includes a storage part 11, a user-environment determining part 12, a rendering part 13, a first point-cloud-data generating part 14, a second point-cloud-data generating part 15, and an inconsistency detecting part 16.

These functions are realized by the server 100 executing programs, by the HMD 200 executing programs, or by the server 100 executing programs and the HMD 200 executing programs. Since various kinds of functions are realized by loading programs, as described above, the function of one part may partially be implemented in another part. As described above, the MR system 10 is realized at least one of the server 100 and the HMD 200 having the various kinds of functions shown in the storage part 11 is included in both the server 100 and the HMD 200 and has functionality for storing programs, data, etc. in the storage unit 104 or 204. In one example, the storage part 11 included in the server 100 stores, in the storage unit 104, data relating to the positions and movements of virtual objects disposed in the virtual space 32 and three-dimensional data of the virtual objects. In one example, the storage part 11 included in the HMD 200 temporarily stores a rendering command received from the server 100 in order to render a virtual object. In another example, the storage part 11 performs data input/output to/from various kinds of databases.

The storage part included in the server 100 includes a three-dimensional-space-data storage part configured to store three-dimensional space data in the storage unit 104. As described earlier, the three-dimensional space data includes point cloud data and vowel data. Here, the point cloud data represents the three-dimensional shapes of real objects in the virtual space 32 associated with the real space 31 acquired in advance, and the vowel data is obtained by converting the point cloud data by using a known method.

Note that since the point cloud data is colored point cloud data, the voxels that are created are colored vowels. Furthermore, each of the voxels has three-dimensional position information. For example, as the three-dimensional position information, each vowel has the three-dimensional coordinates (x, y, z) of the cubic vertex nearest the origin of three-dimensional coordinates set in the virtual space 32.

In one example, the server 100 has the functionality of a database server, and the server 100 outputs the stored three-dimensional space data as appropriate in response to queries relating to three-dimensional position information. Alternatively, however, the storage part 11 included in the HMD 200 may include a three-dimensional-space-data storage part for storing the three-dimensional space data in the storage unit 204.

The user-environment determining part 12 determines a user environment including the position of the HMD 200 and a visual field region visually recognized by the user through the display unit 202 (user-visual-field region), on the basis of the data obtained from the sensors 206 and the three-dimensional data. The user-environment determining part 12 realizes high-precision position tracking of the user.

Preferably, the user-environment determining part 12 utilizes localization technology. In one example, the user-environment determining part 12 determines the position of the HMD 200 and the user-visual-field region by executing (1) initial position alignment and (2) calculation of the amount of relative movement.

As (1) initial position alignment, the user-environment determining part 12 associates and compares the real space 31 and the virtual space 32 with each other by using the data obtained from the sensors 206 and the three-dimensional space data acquired in advance. In this way, the position of the HMD 200 as an initial position, as well as a user-visual-field region, are determined.

In one example, the user-environment determining part 12 performs initial position alignment as follows. The user-environment determining part 12 acquires image data by means of a camera, acquires shape data by means of a depth sensor, and determines the shapes of real objects visually recognizable by the user in the user-visual-field region. Meanwhile, the user-environment determining part 12 determines a provisional user environment, which is a rough user environment, by using a GPS sensor, a Bluetooth (registered trademark) beacon, WiFi, etc. After determining the provisional user environment, the user-environment determining part 12 obtains, from the storage unit 104 or the storage unit 204, three-dimensional space data such as the position information and color information of voxels visually recognizable by the user within predetermined ranges of position and direction from the provisional user environment.

The user-environment determining part 12 determines the position of the HMD 200 and a user-visual-field region by comparing and matching the shapes of real objects in the user-visual-field region as determined from image data and shape data with the shapes of real objects derived from the position information and color information of voxels acquired on the basis of the provisional user environment.

As (2) calculation of the amount of relative movement, the user-environment determining part 12 calculates the amount of relative movement in the real space 31 from the initial position determined as described above, by using data obtained from the sensors 206, thereby determining the position of the HMD 200 and a user-visual-field region. In one example, the user-environment determining part 12 calculates the amounts of relative movement along six axes (e.g., 6 DOF coordinates) by using data obtained from a gyro sensor, an acceleration sensor, etc. At this time, the user-environment determining part 12 can also use the amount of change in the image data obtained from a camera. Furthermore, in one example, the user-environment determining part 12 calculates the amounts of relative movement along six axes by utilizing SLAM technology.

By configuring the user-environment determining part 12 so as to calculate the amount of relative movement after the initial position alignment, as described above, it becomes possible to determine a user environment with high precision, while reducing the amount of information processing by the system as a whole.

The rendering part 13 renders a virtual object corresponding to the user environment determined by the user-environment determining part 12 on the display unit 202 of the HMD 200. The rendering part 13 generates and renders a right-eye image (virtual object) to be visually recognized by the right eye of the user and a left-eye image (virtual object) to be visually recognized by the left eye of the user.

In one example, the CPU of the server 100 writes a rendering command to the main memory and sends the rendering command to the HMD 200. The CPU of the HMD 200 writes rendering data to a frame buffer or the like on the video memory with reference to the received rendering command to render the content read from the frame buffer as is on the display unit 202. In creating the rendering command, the rendering part 13 determines the position and orientation of a virtual object to be displayed on the display unit 202 by using the position of the HMD 200 and the user-visual-field region, determined by the user-environment determining part 12.

As described above, the rendering part 13 is realized by sharing the work between the server 100 and the HMD 200. Alternatively, however, the rendering part 13 may be realized by executing the entire rendering processing in the HMD 200. Alternatively, the rendering part 13 may be realized by executing the entire rendering processing in the server 100, sending the image data to the HMD 200, and displaying the received image data by the HMD 200.

The first point-cloud-data generating part 14 generates point cloud data of real objects and a virtual object from a combined image obtained by displaying the virtual object rendered by the rendering part 13 in a superimposed fashion on a real-space image visually recognized by the user through the display unit 202. In this specification, this point cloud data will be referred to as first point cloud data. The first point cloud data can also be referred to as an actual point cloud since the first point cloud data is obtained from the result of actual rendering using a real-space image in which a virtual object is displayed in a superimposed fashion.

Here, since the display unit 202 and the photographing unit 203 are not usually located at the same place, a real-space image photographed by the photographing unit 203 is not a real-space image visually recognized by the user through the display unit 202, i.e., a naked-eye visual-field image. The first point-cloud-data generating part 14 generates a naked-eye visual-field image by way of projective transformation by applying a projection matrix calculated from internal parameters to a real-space image photographed by the photographing unit 203. The internal parameters are camera parameters calculated from the positional relationship between the relevant photographing unit 203 and display unit 202, such as the angle of view and the visual field range.

For example, in the HMD 200 shown in FIG. 7, the right-eye camera 203a is a camera for acquiring a real-space image to be visually recognized by the right eye of the user through the right-eye transmissive display 202a. The first point-cloud-data generating part 14 generates a real-space image to be visually recognized by the right eye of the user through the right-eye transmissive display 202a (right-eye naked-eye visual-field image) by way of projective transformation by applying a projection matrix calculated from the internal parameters to the image obtained from the right-eye camera 203a. The internal parameters are camera parameters, such as the angle of view and the visual field range, calculated from the positional relationship between the right-eye camera 203a and the right-eye transmissive display 202a. The left-eye transmissive display 202b and the left-eye camera 203b work similarly to the right-eye transmissive display 202a and the right-eye camera 203a.

Furthermore, the real-space images (naked-eye visual-field images) visually recognized by the user through the display unit 202 are stereoscopic images photographed by the photographing unit 203. The first point-cloud-data generating part 14 uses combined images obtained by displaying a virtual object rendered by the rendering part 13 in a superimposed fashion on the individual naked-eye visual-field images individually generated from the two real-space images acquired as stereoscopic images. The first point-cloud-data generating part 14 calculates the depths of the individual pixels by way of stereoscopic matching by using the two naked-eye visual-field images (for the right eye and for the left eye) generated by combining as described above, thereby generating first point cloud data including point cloud data of real objects and a virtual object. In the stereoscopic matching, the depths of the individual pixels are calculated from parallax information of the videos (images) from the right-eye camera and the left-eye camera, and the depths are converted into a point cloud in the three-dimensional space. At the time of this conversion into a point cloud, it is also possible to map color information.

The second point-cloud-data generating part 15 generates point cloud data by using the point cloud data for the position of the HMD 200 and the user-visual-field region determined by the user-environment determining part 12, stored by the three-dimensional-space-data storage part, as well as the point cloud data of the virtual object that is rendered by the rendering part 13. In this specification, this point cloud data will be referred to as second point cloud data. Since the second point cloud data is ideal point cloud data in the virtual space 32, in which point cloud data acquired in advance by using a laser scanner and point cloud data of virtual object that is rendered by the rendering part 13 are used, the second point cloud data can also be referred to as an ideal point cloud. The point cloud data of a virtual object can be generated from a video (image) in which a moving virtual video (image) of a character or the like has been rendered. Alternatively, the configuration may be such that point cloud data used for rendering a virtual object is utilized by the second point-cloud-data generating part 15.

Preferably, the second point-cloud-data generating part 15 generates second point cloud data by adding the point cloud data of a virtual object that is rendered by the rendering part 13 to point cloud data obtained and stored in advance by the three-dimensional-space-data storage part.

Since the data used when generating the second point cloud data is data in the virtual space 32 in which a virtual object is superimposed on the virtual space 32, as described above, in principle, a geometric inconsistency does not occur in the second point cloud data. In this respect, the second point cloud data differs from the first point cloud data, which is generated from images of the real space 31 in which a virtual object is displayed in a superimposed fashion.

FIGS. 13 and 14 are schematic illustrations for explaining the generation of first point cloud data and second point cloud data according to the embodiment of the present invention. FIGS. 13 and 14 show how a user present in the mixed-reality space 33 visually recognizes a wall 36, which is a real object, and a virtual object 37 rendered as being superimposed in front of the wall 36 through the display unit 202, as well as first point cloud data and second point cloud data that are generated in this state.

In FIG. 13, the user visually recognizes the virtual object 37 contacting the wall 36. In this case, geometric consistency is maintained between the wall 36 (real object) in the real space 31 and the virtual object 37, and the first point cloud data and the second point cloud data that are generated are substantially the same, as shown in FIG. 13.

In FIG. 14, the user visually recognizes the virtual object 37 partially buried in the wall 36. In this case, geometric consistency is not maintained (there is an inconsistency) between the wall 36 (real object) in the real space 31 and the virtual object 37, and it will be understood that there is a difference between the first point cloud data and the second point cloud data that are generated, as shown in FIG. 14.

The inconsistency detecting part 16 detects an inconsistency on the basis of the result of comparison between the above-described first point cloud data and second point cloud data.

Preferably, the inconsistency detecting part 16 performs inconsistency detection before a virtual object that is subject to inconsistency detection is rendered by the rendering part 13. In this case, similarly, the first point-cloud-data generating part 14 and the second point-cloud-data generating part 15 generate first point cloud data and second point cloud data before the virtual object that is subject to inconsistency detection is rendered by the rendering part 13. With this configuration, it becomes possible to perform inconsistency detection before a virtual object lacking geometric consistency is rendered on the display unit 202, i.e., before such a virtual object is visually recognized by the user. This enables the MR system 10, for example, to send correction information to position tracking before rendering a virtual object lacking geometric consistency. In one example, it is possible to prevent the display of a virtual object that considerably compromises reality by canceling processing for rendering the virtual object or by moving the position at which the object is rendered. Alternatively, however, the part mentioned above may be configured so as to be executed when a virtual object that is subject to inconsistency detection is rendered by the rendering part 13 or within an extremely short time after rendering.

In one example, the inconsistency detecting part 16 detects an inconsistency in the case where the difference between the first point cloud data and the second point cloud data exceeds a predetermined amount. That is, the inconsistency detecting part 16 determines whether or not there is an inconsistency, to detect an inconsistency on the basis of the number of point data (the amount of point cloud data difference) for which, at corresponding positions in the first point cloud data and the second point cloud data, point data exists in either one and point data does not exist in the other. For example, the amount of point cloud data difference is calculated by deleting points at which the first point cloud data and the second point cloud data collide with each other at corresponding three-dimensional positions. In this case, the first point cloud data, which is generated by using images obtained from the photographing unit 203, is usually sparse data compared with the second point cloud data, which is generated in the virtual space 32, and is likely to include a number of point data items that is less by a factor of a few to ten compared with the second point cloud data. Therefore, in this case, preferably, the amount of point cloud data difference is calculated by increasing the size of each point in the first point cloud data to a size that is a few times to ten times as large as the size of each point in the second point cloud data and then deleting points at which the first point cloud data and the second point cloud data collide with each other at corresponding three-dimensional positions.

In one example, the inconsistency detecting part 16 detects an inconsistency in the case where the difference between the first point cloud data and the second point cloud data exceeds a predetermined amount is a certain three-dimensional space region including the virtual object 37 that is rendered by the rendering part 13. With this configuration, it becomes possible to detect only inconsistencies around a virtual object that would confer a sense of unnaturalness when visually recognized by the user, while excluding detection of inconsistencies outside the region around the virtual object.

In this manner, by comparing the first point cloud data obtained from the result of actual rendering using images of the real space 31 on which a virtual object is displayed in a superimposed fashion and the second point cloud data generated in the virtual space 32, for example, by calculating the difference, it is possible to detect an inconsistency. That is, it becomes possible to detect a situation where "a point cloud that should exist is absent" or "a point cloud that should not exist is present".

The first point-cloud-data generating part 14, the second point-cloud-data generating part 15, and the inconsistency detecting part 16 should preferably be included in the HMD 200. With this configuration, in the processing for detecting an inconsistency in the MR system 10, there is no need for the HMD 200 to send image data via the network 50. This makes it possible to reduce the amount of information processing by the system as a whole.

Although the MR system 10 encompassing an inconsistency detecting system has been described above, an inconsistency detecting system 1 according to the embodiment of the present invention should preferably be a system that is separate from the MR system 10. In this case, the inconsistency detecting system 1 includes a server 100 and one or more HMDs 200, and the server 100 and the HMDs 200 are connected to a network 50 such as the Internet so as to be able to communicate with each other. The inconsistency detecting system 1 can also be realized by using a server (hardware) and a network different from those of the MR system 10. In this case, the inconsistency detecting system 1 is configured so as to be able to carry out communications with the MR system 10.

Figure 15:
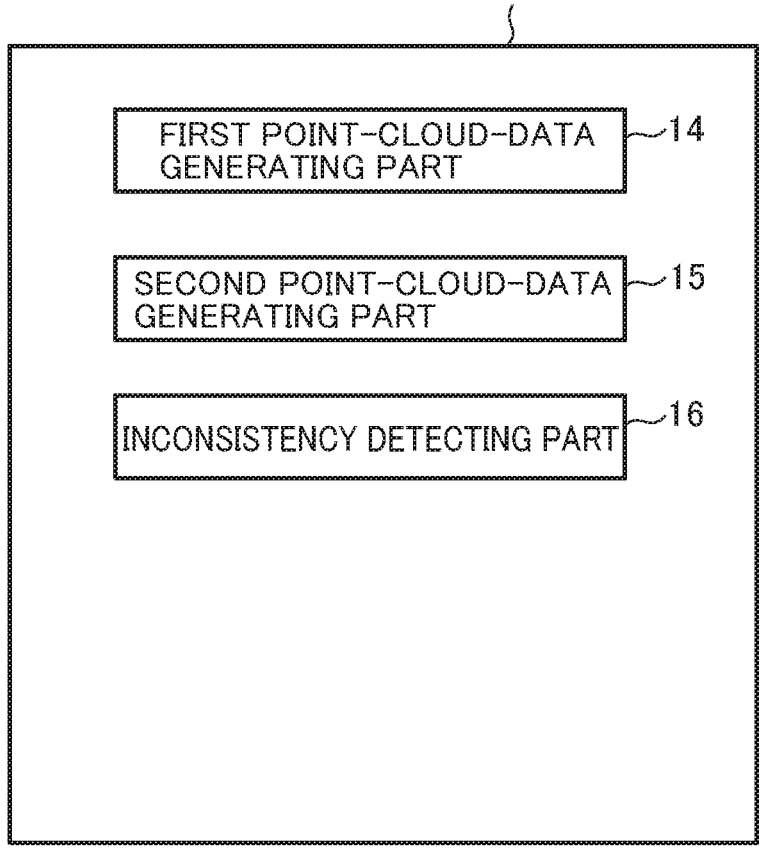
FIG. 15 is a functional block diagram of an inconsistency detecting system according to an embodiment of the present invention.

FIG. 15 shows a functional block diagram of the inconsistency detecting system 1 according to an embodiment of the present invention. The inconsistency detecting system 1 includes a first point-cloud-data generating part 14, a second point-cloud-data generating part 15, and an inconsistency detecting part 16. The first point-cloud-data generating part 14, the second point-cloud-data generating part 15, and the inconsistency detecting part 16 should preferably be included in the HMD 200. In this case, these functions are realized by the HMD 200 executing programs, and the HMD 200 obtains information from the server 100 as needed. Alternatively, however, the functions may be realized by the server 100 executing programs, or may be realized by the server 100 executing programs and also the HMD 200 executing programs. Furthermore, since various kinds of functions are realized by loading programs, as described above, the function of one part may partially be implemented in another part.

Figure 16:
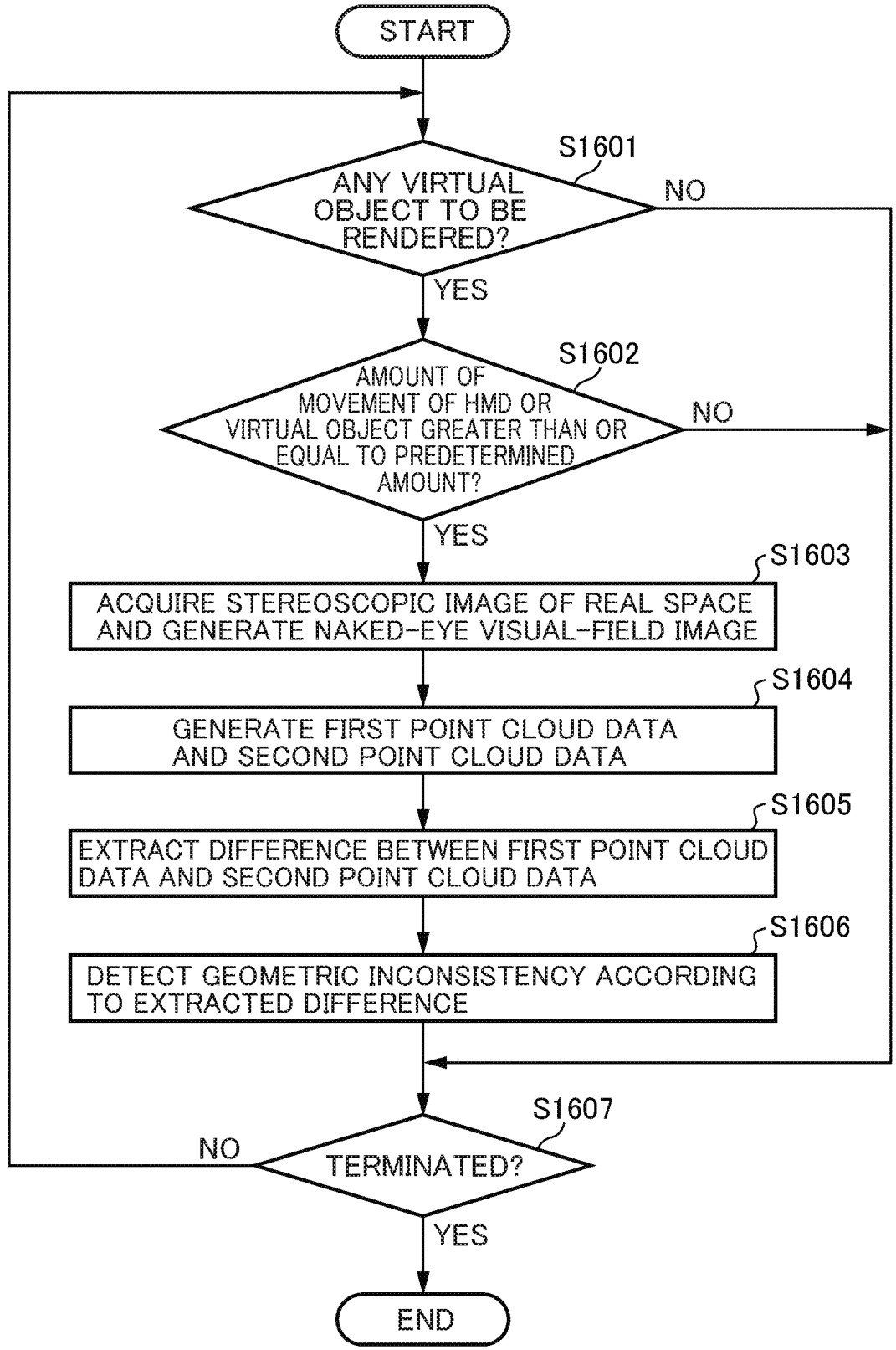
FIG. 16 is a flowchart showing information processing for detecting an inconsistency in the MR system according to the embodiment of the present invention.

As mentioned earlier, FIG. 16 is a flowchart showing information processing for detecting an inconsistency in the MR system 10 according to the embodiment of the present invention. This information processing is realized by the server 100 executing a program, the HMD 200 executing a program, or the server 100 executing a program and also the HMD 200 executing a program. Preferably, this information processing is realized by the HMD 200 executing a program, and the HMD 200 obtains data from the server 100 as needed. It is assumed that the user wears the HMD 200 and is present in the real space 31 (the mixed-reality environment 33).

Furthermore, since the MR system 10 has to continually grasp the user environment in order to provide the user with the mixed-reality space 33, the MR system 10 determines the user environment periodically or as needed.

First, it is determined whether or not there is a virtual object to be rendered by the MR system 10 in the determined user environment (step 1601). In the case where there is no virtual object to be rendered, the processing returns to step 1601 as long as the MR system 10 continues to provide the user with the mixed-reality environment 33 (step 1607). With this configuration, in which inconsistency detection is not performed in the case where there is no virtual object to be rendered, as described above, it is possible to reduce the electrical energy consumption while also reducing the amount of information processing by the system as a whole. However, this step may be omitted.

In the case where there is a virtual object to be rendered, it is determined whether or not the amount of physical movement of the HMD 200 or the amount of movement of the virtual object to be rendered is greater than or equal to a predetermined threshold (step 1602). In the case where the amount of movement of the HMD 200 or the amount of movement of the virtual object to be rendered is greater than or equal to the predetermined threshold, it is highly likely that geometric consistency of the virtual object to be rendered in relation to real objects would be lost, and thus the processing proceeds to step 1603. Meanwhile, in the case where the amount of movement of the HMD 200 or the amount of movement of the virtual object to be rendered is less than the predetermined threshold, the processing returns to step 1601 as long as the MR system 10 continues to provide the user with the mixed-reality environment 33 (step 1607). With this configuration, in which inconsistency detection is not performed in the case where a geometric inconsistency is not likely to occur, as described above, it is possible to reduce the electrical energy consumption while also reducing the amount of information processing by the system as a whole. However, this step may be omitted.

Then, stereoscopic images of the real space are obtained from the photographing unit 203 of the HMD 200, and a projection matrix is applied to the stereoscopic images to virtually generate naked-eye visual-field images (step 1603). In this manner, a video (image) to be recognized by the user is mechanically reproduced by using the images from the photographing unit 203.

Then, in step 1604, from a combined image obtained by displaying the virtual object to be rendered in a superimposed fashion on the generated naked-eye visual-field images, first point cloud data, which is point cloud data of real objects and the virtual object, generated. At the same time as generating the first point cloud data, point cloud data for the real space 31, acquired in advance by using a laser scanner, is added to generate second point cloud data, which is ideal point cloud data for the virtual space 32.

In this information processing, preferably, the first point cloud data and the second point cloud data are generated substantially at the same time; however, either processing may be performed first in a series fashion, or processing may be performed simultaneously in a parallel fashion. The processing for generating the second point cloud data may be started before or simultaneously with the processing in step 1603.

Then, the difference between the first point cloud data and the second point cloud data is extracted (step 1605). Specifically, by deleting points at which the first point cloud data and the second point cloud data collide with each other at corresponding three-dimensional positions, the number of point data for which point data exists in either one and point data does not exist in the other is extracted. This difference calculation makes it possible to recognize whether there is a difference between the shape as viewed by the naked eye of the user and the ideal shape anticipated by the MR system 10.

Then, a geometric inconsistency is detected by using the extracted difference (step 1606). With the extracted difference, a space in which an actual point cloud corresponding to an ideal point, cloud does not exist, i.e., a space in which "a point cloud that should exist is absent", and a space in which an ideal point cloud corresponding to an actual point cloud does not exist, i.e., a situation where "a point cloud that should not exist is present", are detected, which are detected as geometric inconsistencies. In one example, an inconsistency s detected in the case where the extracted difference exceeds a predetermined amount. In another example, an inconsistency is detected in the case where the difference extracted in a predetermined three-dimensional space region including the virtual object to be rendered exceeds a predetermined amount.

Then, the processing returns to step 1601 as long as the MR system 10 continues to provide the user with the mixed-reality environment 33 (step 1607).

Next, the operations and advantages of the MR system 10 and the inconsistency detecting system 1 according to the embodiment of the present invention will be described. First, in this embodiment, point cloud data representing the three-dimensional shapes of real objects in the real space 31 is acquired in advance, and the MR system 10 converts the acquired point cloud data into a data structure called voxels by using a known method and stores the point cloud data and the voxel data in the storage unit 104 or 204 as three-dimensional space data. The MR system 10 associates the real space 31 and the virtual space 32 with each other on the basis of the three-dimensional space data acquired in advance and stored as described above as well as data obtained from the sensors 206 of the HMD 200 worn by the user. This makes it possible to realize high-precision position tracking of the user.

In this embodiment, point cloud data that can be generated from a combined image in which an image of a virtual object in the virtual space 32 is superimposed on a stereoscopic image of the real space 31 obtained from the camera included in the HMD 200 is compared with point cloud data obtained by adding point cloud data of the virtual object in the virtual space 32 to point cloud data of the real space 31 acquired in advance by using a high-precision laser scanner. By this comparison, it is detected whether or not there is geometric consistency between an image of the real space 31 and an image of the virtual space 32 displayed in a superimposed fashion through the transmissive display 202 when viewed from the viewpoint of the user wearing the HMD 200. With this configuration, an inconsistent relationship between a virtual object and the real world in an image to be actually viewed by the user is detected, which makes it possible to detect position tracking errors in the MR system 10, for which self-detection has not been possible before. This makes it possible to send correction information to position tracking without displaying an inconsistent image on the screen. Since it is not possible to realize errorless position tracking at the current technological level, the embodiment of the present invention, which makes it possible to detect an inconsistency from an image to be viewed by the user and to correct position information or the like according to the result, has a high technical significance.

Furthermore, in this embodiment, it is possible to calculate depths by using an image obtained by combining in a memory instead of using an image obtained from a camera as is and to verify the result of rendering by the MR system 10. This makes it possible to detect "inconsistent rendering" by the MR system 10, i.e., rendering processing executed by the MR system 10 and lacking geometric consistency, before rendering a virtual object or in an extremely short time after rendering.

Figure 17:
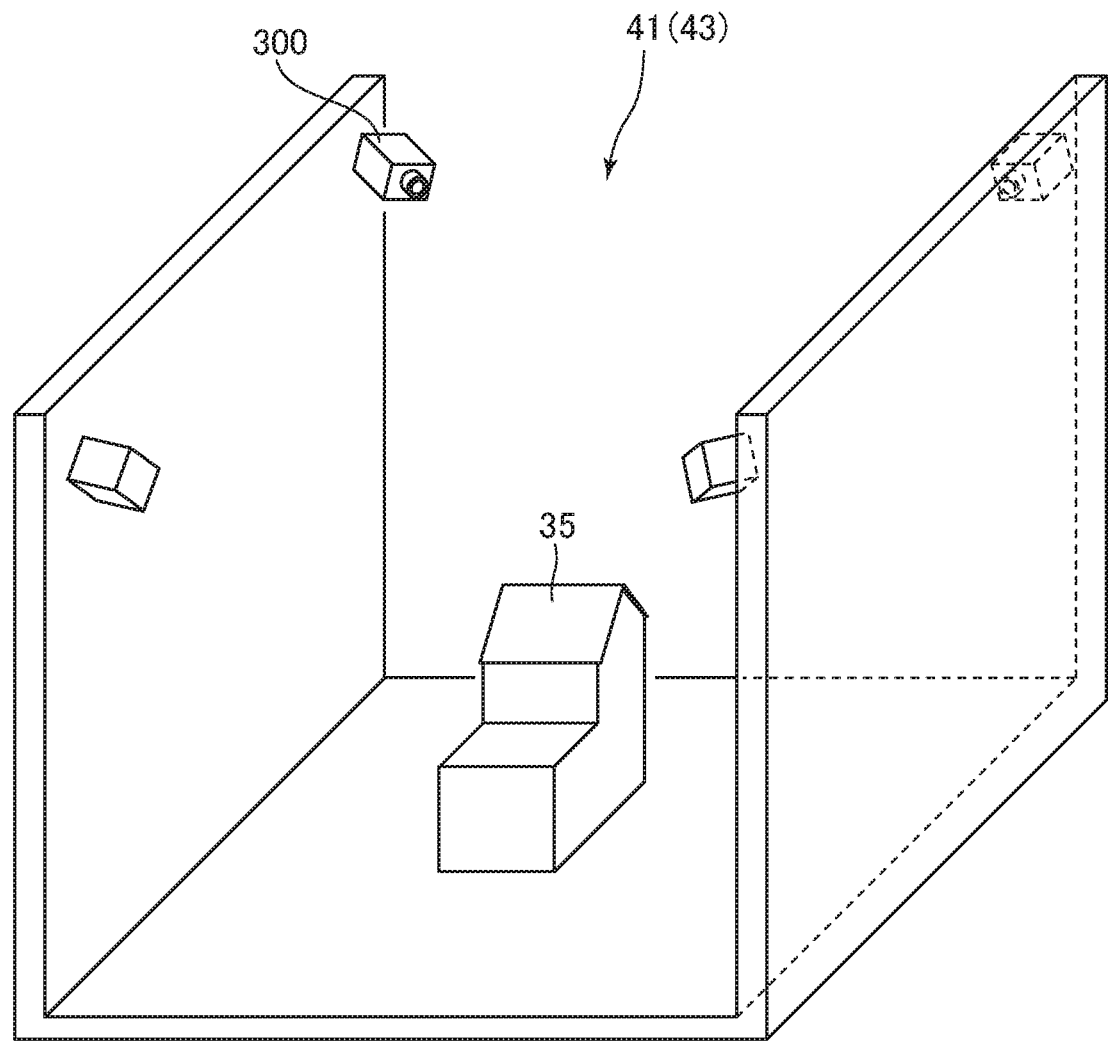
FIG. 17 is a schematic illustration of a real space according to an embodiment of the present invention.

A real-world space (predetermined real space) in which an MR system 10 according to another embodiment, of the present invention provides a user with a mixed-reality environment 33 may be a real space 41 that is an outdoor space, as shown in FIG. 17. The real space 41 is the same as the real space 31 except in that the ceiling and a pair of side walls are omitted and the light source 22 including sunlight is provided outside the real space instead of inside the real space. Also in this case, the virtual space 42 is considered as being limited to a region associated with the real space 41 ($0 \leq X \leq X1$, $0 \leq Y \leq Y1$, $0 \leq Z \leq Z1$).

In another embodiment, of the present invention, by using a table in which the position information of voxels is associated with the position information of individual pixels of images acquired by the image acquisition devices 300, the color information of voxels is determined and updated according to the color information of the pixels of the images acquired by the image acquisition devices 300. By using the table in this manner, it becomes possible to reflect the color information acquired by the image acquisition devices 300 in real time in the individual voxels. This makes it possible to recognize the colors of the real space 31 with high precision and in real time and to reflect the colors in the virtual space 32 in the mixed-reality environment in which the shapes in the real space are reproduced with high precision.

In this case, it as possible to use the color information of voxels, reflected in real time, as the color information of voxels used by the user-environment determining part 12.

Furthermore, in another embodiment of the present invention, the individual voxels in which the colors of the real space 31 are reflected as described above are used as virtual indirect illumination (light sources) for a virtual object to be rendered. This makes it possible to realize global illumination utilizing the state of light in the real space 31, which makes it possible to render a virtual object having colors and shades extremely close to those in the environment of the real space 31.

Furthermore, in another embodiment of the present invention, it becomes possible to utilize the real space 31 as if it is the virtual space 32 in the real space 31. For example, it becomes possible for a game developer to handle a real space in the same manner as a game space (virtual space) in a game engine.

In the processing or operation described above, it is possible to freely modify the processing or operation as long as no inconsistency arises in the processing or operation, such as an inconsistency that a certain step involves the use of data that could not yet be available in that step. Furthermore, the embodiments described above are examples for explaining the present invention, and the present invention is not limited to the embodiments. The present invention can be embodied in various forms not departing from the spirit thereof.

REFERENCE SIGNS LIST

1 Inconsistency detecting system
10 Mixed-reality (MR) system
11 Storage part
12 User-environment obtaining part
13 Rendering part
24 Character (virtual object)
25, 26 Pedestal
27 Wall
21, 31, 41 Real world (real space)
22, 32, 42 Virtual world (virtual space)
23, 33, 43 Mixed-reality world (mixed-reality environment)
34 Light source
35 Building
36 Wall
37 Virtual object
50 Network
100 Server
101, 201 Processing unit
102, 202 Display unit
103 Input unit
104, 204 Storage unit
105, 205 Communication unit
110, 210 Bus
200 Display unit
202a. Right-eye transmissive display
202b Left-eye transmissive display
203 Photographing unit
203a Right-eye camera
203b Left-eye camera
206 Sensors
300 Image acquisition device

The invention claimed is:

1. An inconsistency detecting system in a mixed-reality system that includes a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, wherein the mixed-reality system includes:
a three-dimensional-space-data storage part configured to store three-dimensional space data including point cloud data of a real object located in the predetermined real space, acquired in advance, the point cloud data each having three-dimensional position information;
a user-environment determining part configured to determine, on the basis of data obtained from a sensor included in the display device and the three-dimensional space data, a user environment including the position of the display device and also including a visual-field region that is visually recognized by the user through the display unit; and
a rendering part configured to render the virtual object on the display unit on the basis of the user environment, and the inconsistency detecting system comprising:
a first point-cloud-data generating part configured to generate first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image;
a second point-cloud-data generating part configured to generate second point cloud data by using point cloud data in the visual-field region determined by the user-environment determining part, stored by the three-dimensional-space-data storage part, as well as point cloud data of the virtual object that is rendered by the rendering part; and an inconsistency detecting part configured to detect an inconsistency on the basis of a result of comparison between the first point cloud data and the second point cloud data.

2. The inconsistency detecting system according to claim 1, wherein the photographing unit acquires real spaces as stereoscopic images, and wherein the first point-cloud-data generating part generates the first point cloud data from individual combined images obtained by individually displaying the virtual object that is rendered by the rendering part, in a superimposed fashion, on individual real-space images that are visually recognized by the user through the display unit, the individual real-space images being generated individually from two real-space images acquired as the stereoscopic images.

3. The inconsistency detecting system according to claim 1, wherein the first point-cloud-data generating part generates the real-space image that is visually recognized by the user through the display unit by subjecting the photographed real-space image to projective transformation on the basis of a positional relationship between the display unit and the photographing unit.

4. The inconsistency detecting system according to claim 1, wherein the inconsistency detecting part detects an inconsistency in the case where the difference between the first point cloud data and the second point cloud data exceeds a predetermined amount.

5. The inconsistency detecting system according to claim 1, wherein the inconsistency detecting part detects an inconsistency in the case where the difference between the first point cloud data and the second point cloud data exceeds a predetermined amount in a predetermined three-dimensional space region including the virtual object that is rendered on the basis of the user environment.

6. A mixed-reality system that includes a server as well as a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, wherein each of the following part is included in the server or the display device:

a three-dimensional-apace-data storage part configured to store three-dimensional space data including point cloud data of a real object located in the predetermined real space, acquired in advance, the point cloud data each having three-dimensional position information;

a user-environment determining part configured to determine, on the basis of data obtained from a sensor included in the display device and the three-dimensional space data, a user environment including the position of the display device and also including a visual-field region that is visually recognized by the user through the display unit;

a rendering part configured to render the virtual object on the display unit on the basis of the user environment;

a first point-cloud-data generating part configured to generate first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image;

a second point-cloud-data generating part configured to generate second point cloud data by using point cloud data in the visual-field region determined by the user-environment determining part, stored by the three-dimensional-space-data storage part, as well as point cloud data of the virtual object that is rendered by the rendering part; and an inconsistency detecting part configured to detect an inconsistency on the basis of a result of comparison between the first point cloud data and the second point cloud data.

7. A non-transitory computer readable medium storing a program for detecting an inconsistency in a mixed-reality system that includes a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, wherein the mixed-reality system includes:

a three-dimensional-space-data storage part configured to store three-dimensional space data including point cloud data of a real object located in the predetermined real space, acquired in advance, the point cloud data each having three-dimensional position information;

a user-environment determining part configured to determine, on the basis of data obtained from a sensor included in the display device and the three-dimensional space data, a user environment including the position of the display device and also including a visual-field region that is visually recognized by the user through the display unit; and a rendering part configured to render the virtual object on the display unit on the basis of the user environment, and wherein the program causes the display device to execute:

a step of generating first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image;

a step of generating second point cloud data by using point cloud data in the visual-field region determined by the user-environment determining part, stored by the three-dimensional-space-data storage part, as well as point cloud data of the virtual object that is rendered by the rendering part; and a step of detecting an inconsistency on the basis of a result of comparison between the first point cloud data and the second point cloud data.

8. A method of detecting an inconsistency in a mixed-reality system that includes a portable display device having a transmissive display unit for displaying a virtual object to a user and also having a photographing unit for photographing a real space and that renders the virtual object on the display unit in a predetermined real space, whereby the virtual object is visually recognized by the user as being superimposed on the real space through the display unit, wherein the mixed-reality system includes:

a three-dimensional-space-data storage part configured to store three-dimensional space data including point cloud data of a real object located in the predetermined real space, acquired in advance, the point cloud data each having three-dimensional position information;

a user-environment determining part configured to determine, on the basis of data obtained from a sensor included in the display device and the three-dimensional space data, a user environment including the position of the display device and also including a visual-field region that is visually recognized by the user through the display unit; and a rendering part configured to render the virtual object on the display unit on the basis of the user environment, and the method comprising:

a step of generating first point cloud data, which is point cloud data of the real object and the virtual object, from a combined image obtained by displaying the virtual object that is rendered by the rendering part, in a superimposed fashion, on a real-space image that is visually recognized by the user through the display unit, the real-space image being generated from the photographed real-space image;

a step of generating second point cloud data by using point cloud data in the visual-field region determined by the user-environment determining part, stored by the three-dimensional-space-data storage part, as well as point cloud data of the virtual object that is rendered by the rendering part; and a step of detecting an inconsistency on the basis of a result of comparison between the first point cloud data and the second point cloud data.

* * * * *